US006807926B2

(12) United States Patent
Shiozaki et al.

(10) Patent No.: US 6,807,926 B2
(45) Date of Patent: Oct. 26, 2004

(54) CONTROL METHOD FOR OUTSIDE CONTROL TYPE FAN COUPLING APPARATUS

(75) Inventors: Ken Shiozaki, Susono (JP); Yoshinobu Iida, Numazu (JP); Takuya Tamura, Mishima (JP)

(73) Assignee: Usui Kokusai Sangyo Kaisha Limited, Shizuoka (JP)

( * ) Notice: Subject to any disclaimer, the term of this patent is extended or adjusted under 35 U.S.C. 154(b) by 63 days.

(21) Appl. No.: 10/366,303

(22) Filed: Feb. 13, 2003

(65) Prior Publication Data

US 2003/0172883 A1 Sep. 18, 2003

(30) Foreign Application Priority Data

Feb. 14, 2002 (JP) ........................................ 2002-037132

(51) Int. Cl.[7] .................................................. F01P 1/06
(52) U.S. Cl. ................................................... 123/41.12
(58) Field of Search .......................... 123/41.12, 192.1; 192/58.43, 58.61, 58.8

(56) References Cited

U.S. PATENT DOCUMENTS

| 5,018,612 | A | * | 5/1991 | Takikawa et al. | ......... | 192/58.62 |
| 5,119,920 | A | * | 6/1992 | Inoue | ..................... | 192/58.681 |
| 5,501,183 | A | * | 3/1996 | Takayama | ................ | 123/41.12 |
| 6,032,775 | A | * | 3/2000 | Martin | ..................... | 192/58.61 |
| 6,125,981 | A | * | 10/2000 | Ito et al. | ................... | 192/58.61 |
| 6,247,567 | B1 | * | 6/2001 | Watanabe | ................ | 192/58.43 |
| 6,550,596 | B2 | * | 4/2003 | Shiozaki et al. | ......... | 192/58.61 |

FOREIGN PATENT DOCUMENTS

| JP | 4-258530 | 9/1992 |
| JP | 4-258531 | 9/1992 |
| JP | 4-51219 | 12/1992 |
| JP | 9-119455 | 5/1997 |
| JP | 2911623 | 4/1999 |
| JP | 2002-081466 | 3/2002 |

* cited by examiner

Primary Examiner—Henry C. Yuen
Assistant Examiner—Jason Benton
(74) Attorney, Agent, or Firm—Gerald E. Hespos; Anthony J. Casella

(57) ABSTRACT

An outside control type fan coupling apparatus has a double valve structure with plural oil supply adjustment holes. Temperature of engine coolant, acceleration of the engine, an air conditioner, vehicle speed and so on are parameters for controlling opening and closing valves of the oil supply adjustment holes. This rotation of the fan is fluctuated so that fan noises at the time of fan rotation fluctuation are suppressed. Also, if engine rotation accelerates to more than a certain level, the fan coupling apparatus is turned Off, and fan noise due to coupling rotation is prevented. Further, if engine rotation is less than a constant rotational speed, the fan coupling apparatus is turned Off, Middle, and fan noise due to coupling rotation of the fan at the time of acceleration and fan noise due to coupling rotation at the time of startup of the engine are prevented.

7 Claims, 19 Drawing Sheets

CONTROL METHOD FOR OUTSIDE CONTROL TYPE FAN COUPLING APPARATUS

BACKGROUND OF THE INVENTION

1. Field of the Invention

This invention relates to a control method for an outside control type fan coupling apparatus of such a type that, in general, rotational speed of a fan for use in cooling an engine in an automobile etc. is controlled by following temperature change in outside circumstance or rotation change.

2. Description of the Related Art

In the past, as this kind of fan coupling apparatuses, there is one of such a structure that, in such a system that an inside of a sealed housing comprising a case and a cover is divided into an oil holding chamber and a torque transmission chamber in which a drive disc is mounted by a partition plate which has an oil supply adjustment hole, and a dam and a circulation flow path which is strung to this and comes over from the torque transmission chamber side to the oil holding chamber are formed in a part of an inside wall of the sealed housing side which holds the oil at the time of rotation and opposes to an outside wall of the drive disc, and disposed is such a valve member that when temperature of outside circumstance exceeds a set value, the supply adjustment hole of the partition plate is opened and when it is less than the set value, the supply adjustment hole is closed, and torque transmission from a driving side to the sealed housing side of a driven side is controlled by increasing and decreasing an effective contact area of oil at a torque transmission gap part which is formed at an opposed wall surface of an outside vicinity of the drive disc and the sealed housing, a pair of electromagnets are disposed at a front surface side or a back surface side of the sealed housing, and, in opposition to one electromagnet, a valve member having magnetization for opening and closing the supply adjustment hole is disposed, or, in opposition to the other electromagnet, a sub-valve member having magnetization for opening and closing the circular flow path is disposed (See, U.S. Pat. No. 2,911,623).

Also, in the JP-A-9-119455 gazette, a viscous fluid joint which transmits output drive torque to an radiator cooling fan by drive torque from an engine of a vehicle and a control method thereof are disclosed. This viscous fluid joint is of such a system that, by transformation of a bimetal which responds to temperature of wind passing through the radiator, a valve is opened and closed so that oil supply quantity is varied and fan rotation is changed.

However, the outside control type fan coupling apparatus of the former has such drawbacks that it is of a complicated structure since generally, electric control takes the lead therein, and it needs large electric power consumption, and it is expensive, and also, in case that an electric system brakes down, operating oil stops its circulation so that the fan coupling apparatus becomes severely damaged. However, since the outside control type tan coupling apparatus has such advantages that it is possible to arbitrarily select water temperature, engine rotational speed, and control factors of auxiliary machine class etc. such as an air conditioner etc., and pertinent fan control can be carried out, improvement for eliminating the above-described drawbacks has been expected.

On one hand, in the cooling method of the latter which relies on only the temperature of wind passing through the radiator, there are such drawbacks that, since it is not possible to have the temperature of the radiator coolant which affects engine cooling performance as a direct controlled object, horsepower is lost due to unnecessary fan rotation, which leads to aggravation of fuel consumption, and also, it is not possible to maintain fan rotation which is good for cooling efficiency of a condenser of the air conditioner, and further, it is not possible to suppress fan noises due to unnecessary fan coupling rotation at the time of acceleration.

This invention is made to solve the above-described problems of the conventional technology, and in particular, proposes a control method for an outside control type fan coupling apparatus in which it is possible to always control the temperature of the radiator coolant to a range of good engine efficiency, and engine performance and fuel consumption are improved, and also, cooling efficiency of the air conditioner can be improved and good fan rotation can be maintained, and further, the coupling rotation at the time of acceleration is prevented and the fan noises can be reduced.

SUMMARY OF THE INVENTION

Inventors of this invention, in light of the problems of the conventional technology, proposed in advance an outside control type fan coupling apparatus which has a simple mechanism, and can save power consumption, and has a safety-On function (which mean that even if the electric system breaks down, the operating oil does not stop but circulates), and can control rotational speed of the fan arbitrarily and precisely by adjusting the oil quantity with a high degree of accuracy in compliance with various operational conditions (Japanese Patent Application 2001-190909).

This outside control type fan coupling apparatus is basically one which adopted a system of controlling a valve member for opening and closing an oil supply adjustment hole through which the operating oil is supplied from an oil holding chamber to a torque transmission chamber by a non-excitation type electromagnet using a permanent magnet, and concretely, in such a structure that an inside of a sealed housing comprising a case which is supported through a bearing on a rotation shaft to whose tip a drive disc is fixed and a cover which is attached to the case is divided into an oil holding chamber and a torque transmission chamber in which the drive disc is mounted by a partition plate which has an oil supply adjustment hole, a dam and a circulation flow path which is strung to this and comes over from the torque transmission chamber side to the oil holding chamber are formed in a part of an inside wall of the sealed housing side which holds the oil at the time of rotation and opposes to an outside wall of the drive disc, and a valve member for opening and closing the oil supply adjustment hole is disposed in the oil holding chamber, and made is such a system that a running torque transmission from a driving side to a driven side is controlled by increasing and decreasing an effective contact area of oil at a torque transmission gap part which is formed by the driving side and the driven side, and at the oil holding chamber side of the sealed housing, one which has such a structure that a non-excitation type electromagnet utilizing a permanent magnet is supported to the rotation shaft through the bearing, and the valve member is operated by the electromagnet and thereby, oil supply adjustment hole is controlled to be opened or closed, and, among them, especially one of such a double valve structure that a plurality of the oil supply adjustment holes are disposed, and an On use valve and a Middle use valve in which the valve member and the non-excitation type electromagnet are disposed with respect to each oil supply adjustment hole are disposed excels at such a point that, since each valve can be opened and closed in steps by changing size of electric current which flows through the electromagnet in steps, the fan rotation can be increased in steps, or increasing speed can be changed.

This invention is one for 3 step On/Off control method, which tries to propose more concrete and various control methods of this outside control type fan coupling apparatus of the double valve structure, and its first control method is of such a substance that when a vehicle moves, acceleration of an engine is detected, and when the acceleration is larger than a set value, the On use valve and the Middle use valve are closed to make the fan Off rotation, and when the acceleration is smaller than the set value, temperature of engine coolant is detected, and when the coolant temperature is smaller than a lower limit threshold value, operating conditions of an air conditioner is detected, and when the air conditioner does not operate, the On use valve and the Middle use valve are closed to make the fan Off rotation, and when the air conditioner operates, the On use valve is closed and the Middle use valve is opened to make the fan Middle rotation, and on the other hand, when the coolant temperature is larger than the lower limit threshold value and smaller than the upper limit threshold value, the On use valve is closed and the Middle use valve is opened to make the fan Middle rotation, and when the coolant temperature is larger than the upper limit threshold value, the engine rotational speed at that time is detected, and in case that the rotational speed is smaller than the lower limit engine rotational speed for making the fan On rotation, the On use valve is closed and the Middle use valve is opened to make the fan Middle rotation, and in case that it is larger than the lower limit engine rotational speed, the On use valve and the Middle use valve is opened, or only the On use valve is opened to make the fan On rotation, and when the engine stops, the On use valve and the Middle use valve are closed to make the fan Off rotation.

A second control method is of such a substance of 5 steps on/Off switching control method that, when a vehicle moves, an acceleration of an engine is detected, and when the acceleration is larger than a set value, the On use valve and the Middle use valve are closed to make a fan Off rotation, and when the acceleration is smaller than the set value, engine coolant temperature is detected, and when the coolant temperature is smaller than a lower limit threshold value, an operational state of an air conditioner is detected, and when the air conditioner does not operate, the On use valve and the Middle use valve are closed to make the fan Off rotation, and when the air conditioner operates, the On use valve is closed and the Middle use valve is opened and closed to make the fan Off rotation—Middle rotation, and on the other hand, when the coolant temperature is larger than the lower limit threshold value and smaller than an upper limit threshold value, the coolant temperature is compared to a middle low threshold value, and when the coolant temperature is lower than the middle low threshold value, the On use valve is closed and the Middle use valve is opened to make the fan Middle rotation, and when the coolant temperature is larger than a middle high threshold value, rotational speed of the engine at that time is detected, and in case that the rotational speed is smaller than a lower limit engine rotational speed for making the fan On rotation, the On use valve is closed and the Middle use valve is opened to make the fan Middle rotation, and in case that it is larger than the lower limit engine rotational speed, the coolant temperature at that time is detected, and the coolant temperature is compared to the upper limit threshold value, and when the coolant temperature is smaller than the upper limit threshold value, the Middle use valve is closed, or the Middle use valve is opened, and the On use valve is opened and closed, or the Middle use valve is opened, and the On use valve is opened and closed to make the fan Middle rotation—On rotation, and when it is larger than the upper limit threshold value, the On use valve and the Middle use valve are opened to make the fan On rotation, and when the engine stops, the On use valve and the Middle use valve are closed to make the fan Off rotation.

A third control method is of such a substance of a step-less switching control method that when a vehicle moves, a fan rotation set value is determined on the basis of temperature of engine coolant, temperature of transmission oil, intake air temperature, compressor pressure of an air conditioner, and vehicle speed, and further, on the basis of the engine rotational speed, fan On rotational speed and fan Middle rotational speed are determined, and when acceleration of the engine is larger than the set value, the On use valve and the Middle use valve are closed to make the fan Off rotation, and when the acceleration is smaller than the set value, the engine rotational speed is detected, and when the rotational speed is smaller than a lower limit engine rotational speed for making the fan On rotation, the temperature of engine coolant is detected, when the temperature of the coolant is lower than the lower limit threshold valve, the On use valve and the Middle use valve are closed to make the fan Off rotation, and when the temperature of engine coolant is larger than the lower limit threshold value, the temperature of engine coolant is detected, when the temperature of the coolant is lower than the lower limit threshold valve, the On use valve is closed and the Middle use valve is opened to have Middle rotation, and when the engine rotational speed is larger than the lower limit engine rotational speed for making the fan On rotation, the fan On rotational speed is compared to the fan rotation set value, and when the fan On rotational speed is smaller than the fan rotation set value, the On use valve and the Middle use valve are opened to make the fan on rotation, and when the fan On rotational speed is larger than the fan rotation set value, the lower limit engine rotational speed for making the fan On rotation is compared to the fan rotation set value, and when the lower limit engine rotational speed for making the fan On rotation is smaller than the fan rotation set value, the fan rotational speed is detected, and when the rotational speed is larger than the fan rotation set value, the On use valve is closed and the Middle use valve is opened to make the fan Middle rotation—On rotation, and when the fan rotational speed is smaller than the fan rotation set value, the On use valve and the Middle use valve are opened to make the fan Middle rotation—On rotation, and when the lower limit engine rotational speed for making the fan On rotation is larger than the fan rotation set value, the fan rotational speed is detected, and when the rotational speed is larger than the fan rotation set value, the On use valve and the Middle use valve are closed to make the fan Off rotation—Middle rotation, and when the fan rotational speed is smaller than the fan rotation set value, the On use valve is closed and the Middle use valve is opened to make the fan Off rotation—Middle rotation, and when the engine stops, the On use valve and the Middle use valve are closed to make the fan Off rotation.

A fourth control method is of such a substance of step-less switching control method that when a vehicle moves, a fan rotation set value is determined on the basis of temperature of engine coolant, temperature of transmission oil, intake air temperature, compressor pressure of an air conditioner, and vehicle speed, and further, on the basis of the engine rotational speed, fan On rotational speed and fan Middle rotational speed are determined, and when acceleration of the engine is larger than the set value, the On use valve and the Middle use valve are closed to make the fan Off rotation, and when the acceleration is smaller than the set value, the engine rotational speed is detected, and when the rotational speed is smaller than a lower limit engine rotational speed for making the fan On rotation, the temperature of engine coolant is detected, when the temperature of the coolant is less than the lower limit threshold valve, the On use valve and the Middle use valve are closed to make the fan Off rotation, and when the temperature of engine coolant is larger than the lower limit threshold value, the On use valve is closed and the Middle use valve is opened to have Middle rotation, and when the engine rotational speed is larger than the lower limit engine rotational speed for making the fan On rotation, the fan on rotational speed is compared to the fan rotation set value, and when the fan On rotational speed is smaller than the fan rotation set value, the On use valve and the Middle use valve are opened, to make the fan On rotation, and when the fan on rotational speed is larger than the fan rotation set value, the fan Middle rotational speed is compared to the fan rotation set value, and when the fan Middle rotational speed is smaller than the fan rotation set value, the fan rotational speed is detected, and when the rotational speed is smaller than the a lower limit of the fan rotation set value, the On use valve is opened at a set opening rate, and the Middle use valve is closed, or the Middle use valve is opened to make the fan Middle rotation—On rotation, and when the fan rotational speed is larger than the lower limit of the fan rotation set value, the fan rotational speed is compared to the upper limit of the fan rotation set value, and when the fan rotational speed is larger than the upper limit of the fan rotation set value, the On use valve is opened at the set opening rate, and the Middle use valve is closed, or the Middle use valve is opened to make the fan Middle rotation—On rotation, and when the fan rotational speed is smaller than the upper limit of the fan rotation set value, the On use valve is opened at the set opening rate, and the Middle use valve is closed, or the Middle use valve is opened to make the fan Middle rotation—On rotation, and when the fan Middle rotational speed is larger than the fan rotation set value, the fan rotational speed is detected, and when the rotational speed is smaller than the lower limit of the fan rotation set value, the On use valve is closed, and the Middle use valve is opened at the set opening rate to make the fan Off rotation—Middle rotation, and when the fan rotational speed is larger than the lower limit of the fan rotation set value, the fan rotational speed is compared to the upper limit of the fan rotation set value, and when the fan rotational speed is larger than the upper limit of the fan rotation set value, the On use valve is closed, and the Middle use valve is opened at the set opening rate to make the fan Off rotation—Middle rotation, and when the fan rotational speed is smaller than the upper limit of the fan rotation set value, the On use valve is closed and the Middle use valve is opened at the set opening rate to make the fan Off rotation—Middle rotation, and when the engine stops, the On use valve and the Middle use valve are closed to make the fan Off rotation.

It is of such a substance of a 3 step On/Off control method that the set opening rates of the On use valve and the Middle use valve are set to full-time 100% full-open, respectively so that a control characteristic of the fan is controlled by 3 steps of Off rotation, Middle rotation, and On rotation.

It is of such a substance of a 5 step switching control method that the set opening rates of the On use valve and the Middle use valve are set to constant opening rates respectively so that a control characteristic of the fan is controlled by 5 steps of Off rotation, Off rotation—Middle rotation, Middle rotation, Middle rotation—On rotation, and On rotation.

It is of such a substance of a step-less On/Off control method that when a vehicle moves, a fan rotation set value is determined on the basis of temperature of engine coolant, temperature of transmission oil, intake air temperature, compressor pressure of an air conditioner, and vehicle speed, and further, on the basis of the engine rotational speed, fan On rotational speed and fan Middle rotational speed are determined, and when acceleration of the engine is larger than the set value, the On use valve and the Middle use valve are closed to make the fan Off rotation, and when the acceleration is smaller than the set value, the engine rotational speed is detected, and when the rotational speed is smaller than a lower limit engine rotational speed for making the fan On rotation, the temperature of engine coolant is detected, when the temperature of the coolant is lower than the lower limit threshold valve, the On use valve and the Middle use valve are closed to make the fan Off rotation, and when the temperature of engine coolant is larger than the lower limit threshold value, the On use valve is closed and the Middle use valve is opened to have Middle rotation, and when the engine rotational speed is larger than the lower limit engine rotational speed for making the fan On rotation, the fan On rotational speed is compared to the fan rotation set value, and when the fan On rotational speed is smaller than the fan rotation set value, the On use valve and the Middle use valve are opened, to make the fan On rotation, and when the fan On rotational speed is larger than the fan rotation set value, the fan Middle rotational speed is compared to the fan rotation set value, and when the fan Middle rotational speed is smaller than the fan rotation set value, the fan rotational speed is detected, and when the rotational speed is smaller than a certain set value, the On use valve is fully opened and the Middle use valve is closed, or the Middle use valve is opened to make the fan Middle rotation—On rotation, and when the fan rotational speed is larger than the certain set value, the On use valve is fully opened and the Middle use valve is closed, or the Middle use valve is opened to make the fan Middle rotation—On rotation, and when the fan Middle rotational speed is larger than the fan rotation set value, the fan rotational speed is detected, and when the rotational speed is smaller than the certain set value, the On use valve is closed and the Middle use valve is fully opened to make the fan Off rotation—Middle rotation, and when the fan rotational speed is larger than the certain set value, the On use valve and the Middle use valve are closed to make the fan Off rotation—Middle rotation, and when the engine stops, the On use valve and the Middle use valve are closed to make the fan Off rotation.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

In this embodiment, 1 designates a drive shaft; 2 designates a sealed housing; 2-1 designates a case; 2-2 designates a cover; 3 designates a drive disc; 4 designates a partition plate; 5 designates an oil holding chamber; 6 designates a torque transmission chamber; 7-1 designates an On rotation use oil supply adjustment hole; 7-2 designates a Middle rotation use oil supply adjustment hole; 8 designates a circulation flow path; 9-1 designates an On rotation use valve member; 9-2 designates a Middle rotation use valve member; 9-1a and 9-2a designate leaf springs; 9-1b and 9-2b designate magnetic pieces; 10 designates a permanent magnet; 11 designates an electromagnet; 12 designates an electromagnet support member; 13 and 14 designate bearings; 15 designates a dam; 21 designates a radiator; 22 designates a fan; 23 designates a fan rotation sensor; 24 designates a fan coupling apparatus apparatus; 25 designates a battery; 26 designates a relay box; 27 designates a main calculation control device; and 28 designates an engine.

Figure 1:
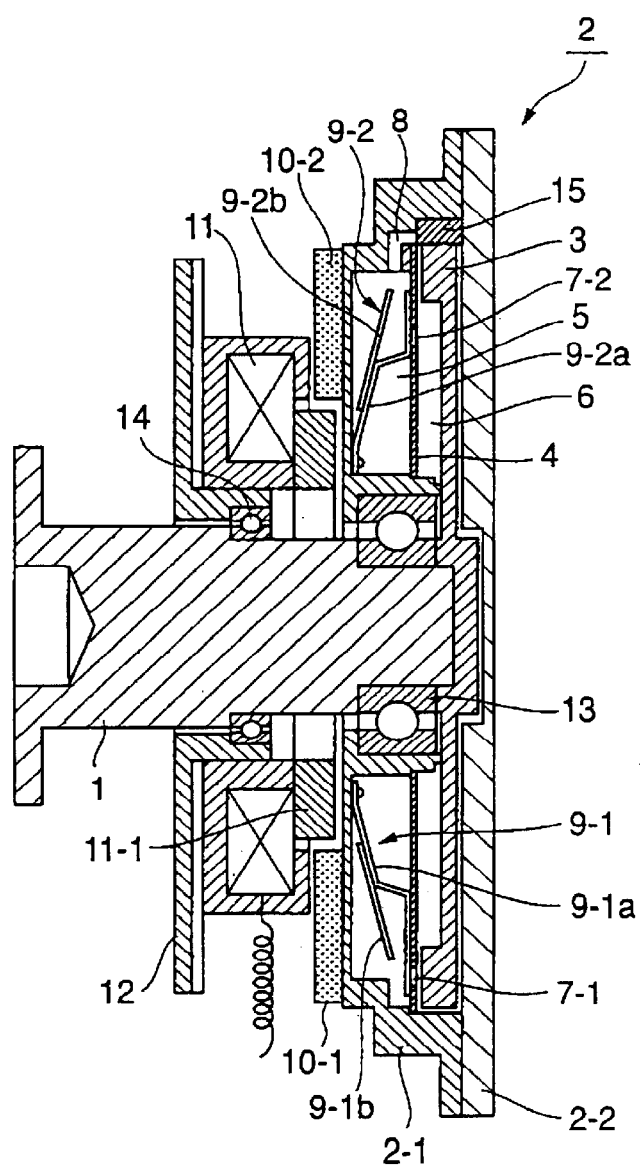
FIG. 1 is a vertical cross sectional view showing one embodiment of an outside control type fan coupling apparatus of a double valve structure according to the invention.

That is, the outside control type fan coupling apparatus (double valve structure) shown in FIG. 1 is of such a structure that a sealed housing 2 comprising a case 2-1 and a cover 2-2 is supported through the bearing 13 to a rotation shaft (drive shaft) 1 which rotates by drive of a drive part (engine), and an inside of this sealed housing 2 is divided into the oil holding chamber 5 and the torque transmission chamber 6 by the partition plate 4 in which two oil supply adjustment holes 7-1 and 7-2 were disposed, and in the torque transmission chamber 6, the drive disc 3 which is fixed to the tip of the rotation shaft 1 is placed in such a manner that a torque transmission gap is formed between it and an inner surface of the torque transmission chamber 6.

The valve members 9-1 and 9-2 for opening and closing the On rotation use oil supply adjustment hole 7-1 and the Middle rotation use oil supply adjustment hole 7-2 comprise the leaf springs 9-1a, 9-2a and the magnetic pieces 9-1b, 9-2b, and made is such a structure that, by the leaf springs 9-1a and 9-2a whose rear anchor parts are fixed to an inner wall of the oil holding chamber 5 and which are always biased toward the partition plate 4 side, the oil supply adjustment holes 7-1 and 7-2 which are disposed in the partition plate 4 are opened and closed.

At the drive part side of the sealed housing 2, the electromagnet 11 is supported by the electromagnet support member 12 which was supported through the bearing 14 to the rotation shaft 1, and in opposition to this electromagnet 11, the permanent magnets 10-1 and 10-2 are mounted on an outer surface of the case 2-1 in opposition to the respective valve members 9-1 and 9-2. 11-1 designates a ring shaped magnetic material. That is, made is such a structure that, when an electric current flows through the electromagnet 11 in such a manner that generated is a magnetic field of a reverse direction to that of a magnetic field formed by the respective permanent magnets 10-1 and 10-2, magnetic fields of the respective permanent magnets 10-1 and 10-2 are canceled out, and thereby, attraction forces of the respective permanent magnets 10-1 and 10-2 disappear, and the valve members 9-1 and 9-2 are pressed to the partition plate 4 side by the action of the leaf springs 9-1a and 9-2a and the On rotation use oil supply adjustment hole 7-1 and the Middle rotation use oil supply adjustment hole 7-2 are closed, and on the other hand, when the electromagnet 11 is turned OFF or an electric current flows through the electromagnet 11 in such a manner that generated is a magnetic field of the same direction as the magnetic field formed by the respective permanent magnets 10-1 and 10-2, the valve members 9-1 and 9-2 are attracted toward the permanent magnets 10-1 and 10-2 side against the leaf springs 9-1a and 9-2a and thereby, the two oil supply adjustment holes 7-1 and 7-2 are opened. In the fan coupling apparatus of the double valve structure described above, when the electromagnet 11 is OFF, or an electric current flows through the electromagnet 11 in such a manner that generated is a magnetic field of the same direction as that of the magnetic field formed by the respective permanent magnets 10-1 and 10-2, the magnetic pieces 9-1b and 9-2b of the valve members 9-1 and 9-2 are attracted by the action of the respective permanent magnets 10-1 and 10-2 against the leaf springs 9-1a and 9-2a and thereby, the On rotation use oil supply adjustment hole 7-1 and the Middle rotation use oil supply adjustment hole 7-2 are opened and also, the opened state thereof is maintained, and thereby, the oil in the oil holding chamber 5 is supplied to the torque transmission chamber 6 through the two oil supply adjustment holes 7-1 and 7-2 in the partition plate 4. And, by this oil supplied to the torque transmission chamber 6, drive torque of the drive disc 3 is transmitted to the case 2-1 and rotational speed of a cooling fan (not shown) which was fixed to the case is increased. Adversely, when an electric current flows through the electromagnet 11 in such a manner that generated is a magnetic field of a reverse direction to that of the magnetic field formed by the respective permanent magnets 10-1 and 10-2, the magnetic fields of the respective permanent magnets 10-1, 10-2 and the electromagnet 11 are canceled out and thereby, attraction forces of the respective permanent magnets 10-1 and 10-2 disappear, and thereby, the respective valve members 9-1 and 9-2 are pressed to the partition plate 4 side by the forces of the leaf springs 9-1a and 9-2a and the two oil supply adjustment holes 7-1 and 7-2 are closed, and also, the opened state thereof is maintained, and thereby, the oil supply from the oil holding chamber 5 to the torque transmission chamber 6 is stopped and by the dam 15, the oil in the torque transmission chamber 6 is returned to the oil holding chamber 5 through the circulation flow path 8, and thereby, torque transmission efficiency is lowered and rotational speed of the case 2-1 is reduced and the cooling fan is slowed down.

In this manner, in case of the fan coupling apparatus of the double valve structure, opening and closing of each valve are carried out by current flow to the electromagnet 11 but, in that case, when magnitude of the electric current flowing through the electromagnet 11 for each valve is changed in steps, the two valves for use in on rotation and Middle rotation can be opened and closed in steps. That is, in case of the fan coupling apparatus of the double valve structure, since each valve can be opened and closed in steps by widely changing magnitude of the electric current flowing through the electromagnet 11 or by changing polarity (+, −) of an electric power supply, the rotational speed of the cooling fan can be increased in steps up to a predetermined rotational speed. Therefore, in case of the fan coupling apparatus of the double valve structure, various controls of the fan rotational speed becomes possible.

Hereinafter, the control method will be described in detail.

Figure 2:
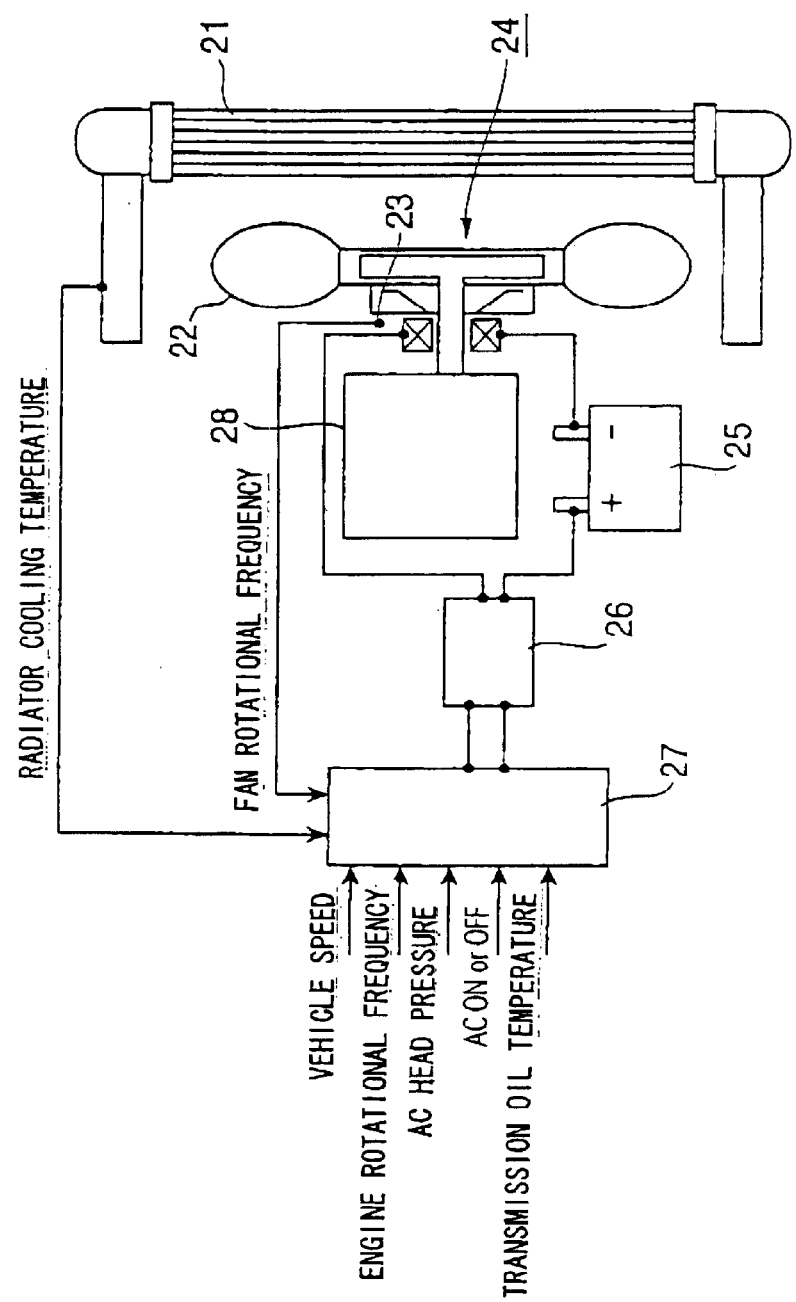
FIG. 2 is a schematic view showing one example of an entire structure of a control system of the outside control type fan coupling apparatus of the double valve structure.

Firstly, a control system for carrying out the control method of the fan coupling apparatus of the double valve structure according to the invention is, as one example thereof is shown in FIG. 2, of such a system that data such as temperature of radiator coolant, fan rotational speed, transmission oil temperature, vehicle speed, engine rotational speed, intake air temperature, compressor pressure of an air conditioner etc. is taken in the main calculation control device 27, and optimum fan rotational speed (range of fan rotational speed) is judged by this main calculation control device 27. And, a valve opening and closing signal which is necessary for varying the fan rotation is sent from the main calculation control device 27 to the relay box 26, and switching is carried out here, and electric power is supplied to an electromagnetic coil of the fan coupling apparatus 24, and an oil supply valve is opened and closed. By sensing the fan rotation which was varied by the oil supply due to this valve opening and closing, the data is fed back to the main calculation control device 27, and again, the optimum fan rotational speed (range of fan rotational speed) is judged based upon the data such as the temperature of the radiator coolant, the transmission oil temperature, the vehicle speed, the engine rotational speed etc.

Next, various control methods of the invention by the control system shown in FIG. 2 will be described based upon FIGS. 3 to 19.

A valve opening and closing control system of the fan coupling apparatus of the double valve structure can be of, roughly divided, (1) 3 step On/Off control (3 step rotational speed control), (2) 5 step switching control, (3) step-less On/Off control, (4) step-less switching control, and (5) combination of (1) to (4) by changing the distance in radial direction of two valves for Middle rotation and On rotation.

Figure 3:
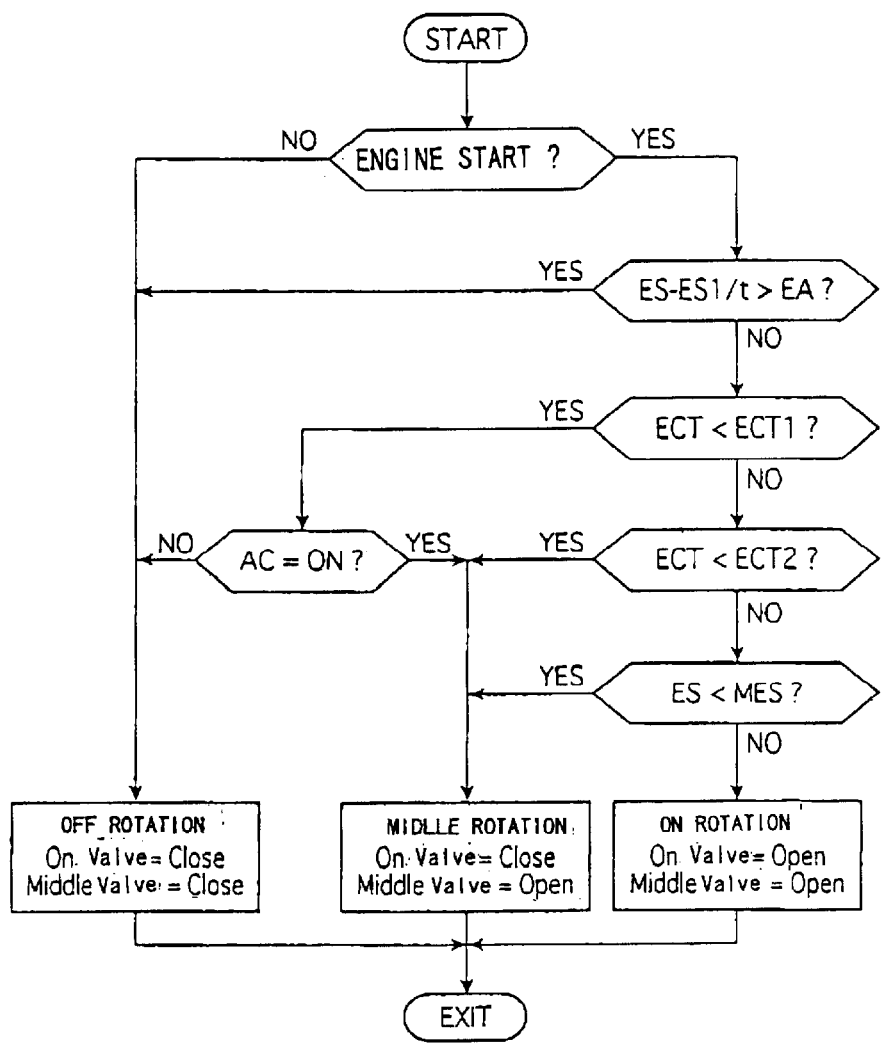
FIG. 3 is a flow chart showing one embodiment of a 3 step On/Off control method of the invention.
Figure 4:
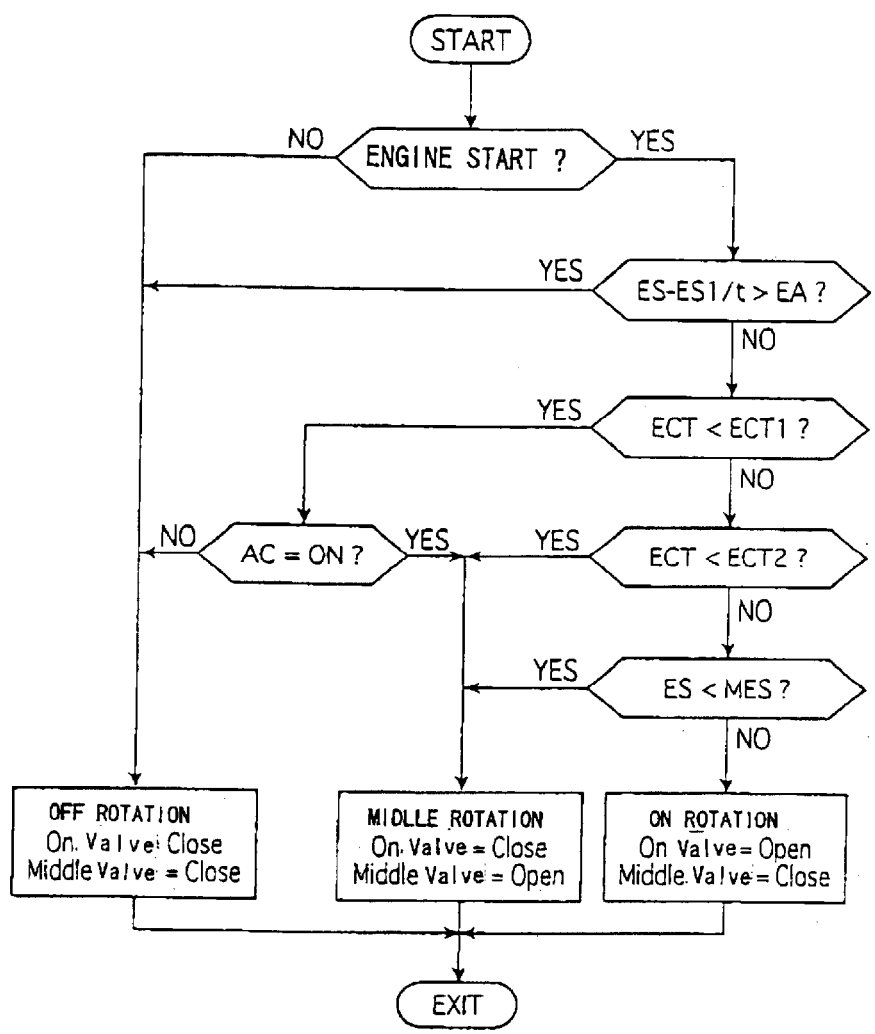
FIG. 4 is a flow chart showing other embodiment of the 3 step On/Off control method.
Figure 5:
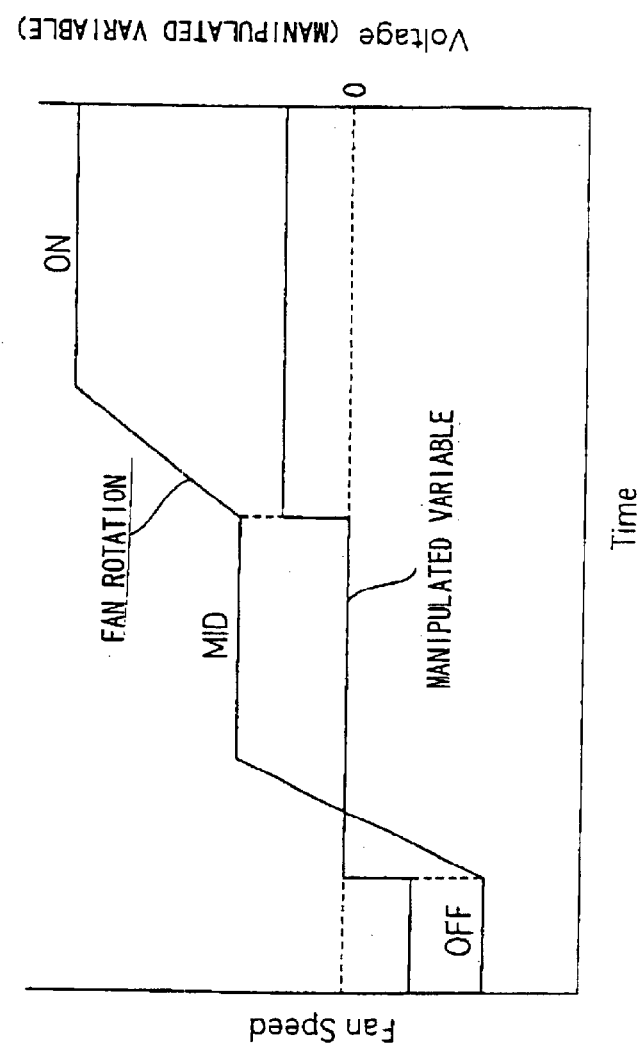
FIG. 5 is a view showing a relationship of manipulated variables and fan rotational speed in the 3 step On/Off control method shown in FIG. 3.
Figure 6:
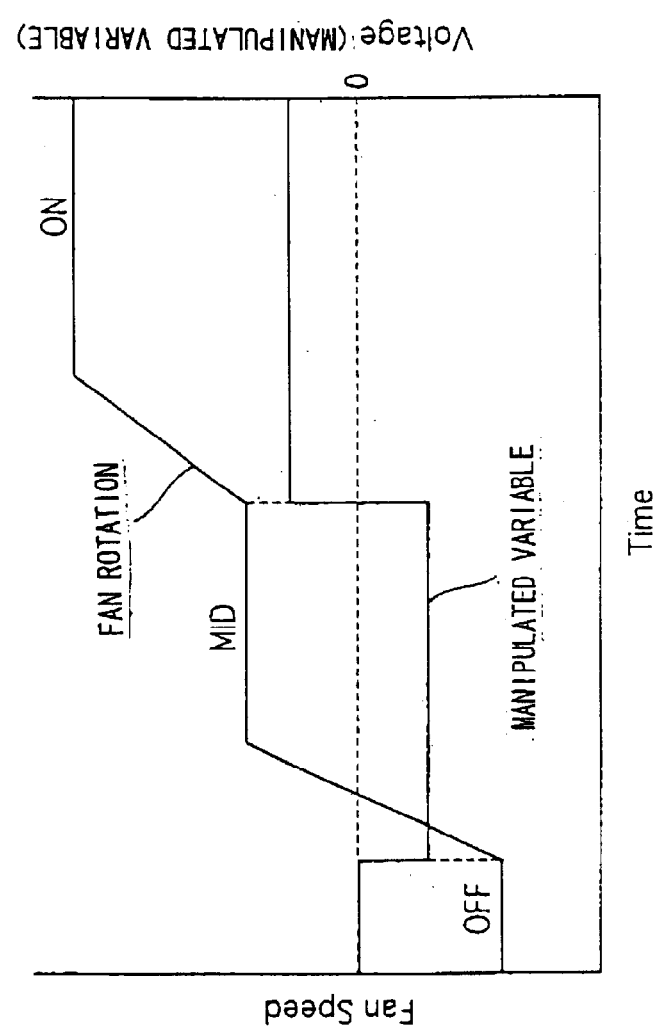
FIG. 6 is a view showing a relationship of manipulated variables and fan rotational speed in the 3 step On/Off control method shown in FIG. 4.
Figure 7:
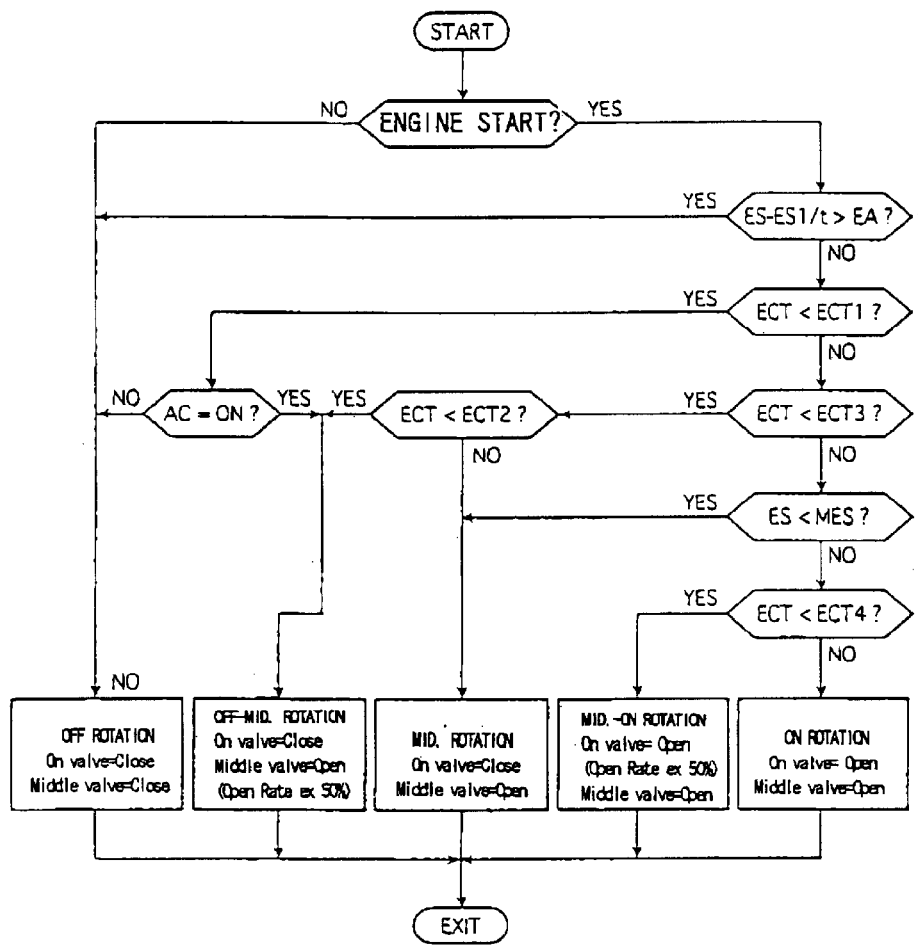
FIG. 7 is a flow chart showing one embodiment of a 5 step switching control method of the same.

A 3 step On/Off control method (3 step rotational speed control) shown in FIGS. 3 to 6 can control 3 stable rotation patterns by a control signal of 1 charge to one electromagnet. That is, the two valves is controlled to be opened and closed by switching of 3 patterns of electric voltage 0V (Off), +12V (On), and −12V (On) and thereby, the fan rotation can be controlled to the 3 stable rotation patterns of On rotation (two valves of electric voltage +12V are opened, or only the On use valve of the electric voltage +12V is opened), Middle rotation (only the Middle valve of electric voltage 0V is opened, or only the Middle valve of the electric voltage −12V is opened), and Off rotation (two valves of the electric voltage −12V are closed, or two voltages of the electric voltage 0V are closed). In addition, 12V is the same voltage as the battery voltage. This 3 step On/Off control method is a method for controlling the fan rotation with parameters of the engine coolant temperature, a state of using the air conditioner, vehicle acceleration state etc. That is, when a vehicle moves, rotational speed ES of a vehicle engine is measured by engine rotational speed measuring means, and based upon previously measured engine rotational speed vale ES1, acceleration of the engine (ES−ES1/t) is detected, and this engine acceleration (actual measurement value) is compared to an engine acceleration set value EA which was set in advance. And, when the actual measurement value is larger than the set value EA, the On use valve and the Middle use valve are closed to make the fan Off rotation, and contrarily, when the actual measurement value is smaller than the set value EA, the engine coolant temperature ECT is measured by coolant temperature measuring means, and the coolant temperature ECT is compared to the engine coolant temperature lower limit threshold value ECT1 which was set in advance. As a result, when the engine coolant temperature ECT is smaller than the coolant temperature lower limit threshold value ECT1, whether the air conditioner AC operates or stops is detected, and when the air conditioner AC stops, the On use valve and the Middle use valve are closed to make the fan Off rotation, and when the air conditioner AC operates, the On use valve is closed and the Middle use valve is opened to make the fan Middle operation. On the other hand, when the coolant temperature ECT is larger than the lower limit threshold value ECT1 and smaller than the engine coolant temperature upper limit threshold value ECT2, the On use valve is closed and the Middle use valve is opened to make the fan Middle rotation, and contrarily, when the coolant temperature ECT is larger than the upper limit threshold value ECT2, the engine rotational speed ES at that time is detected, and in case that the rotational speed ES is smaller than the lower limit engine rotational speed MES for making the fan On rotation, the On use valve is closed, and the Middle use valve is opened to make the fan Middle rotation, and in case that the engine rotational speed ES is larger than the lower limit engine rotational speed MES, the On use valve and the Middle use valve are opened, or only the On use valve is opened as shown in FIG. 4 to make the fan On rotation.

In addition, when the engine stops, the On use valve and the Middle use valve are closed to make the fan Off rotation.

According to this 3 step On/Off control method, sine the engine coolant temperature ECT, the state of using the air conditioner AC, the vehicle speed (acceleration) etc. are detected and the fan rotational speed are varied by 3 steps, water temperature can be held in a certain constant range (ECT1–ECT2), and also, regardless of the engine coolant temperature ECT, in case that the engine rotation is accelerated above a certain level, the fan coupling apparatus is forcibly turned off and fan noises due to coupling rotation can be prevented, and further, when the engine is less than a certain rotational speed, a state of the fan coupling apparatus is made to be Off rotation and Middle rotation and thereby, the fan noises due to fan coupling rotation at the time of acceleration can be prevented, and furthermore, when the engine starts up, the fan coupling apparatus is always held to Off state, and the fan noises due to start-up coupling rotation can be prevented.

In addition, as to control factors, other than the above-described ones, transmission temperature, intake air temperature, AC compressor pressure, vehicle speed, accelerator opening rate etc. can be used for judging the fan rotation control.

A 5 step switching control method shown in FIGS. 7 to 10 is a method for switching and controlling the fan rotation step in 5 steps of Off, Off-Middle, Middle, Middle-On, and On, by switching and controlling the On use valve and the Middle use valve at a certain determined duty rate (mainly, pulse width) by using the engine coolant temperature, the state of using the air conditioner, acceleration state of the vehicle etc. as parameters.

Figure 8:
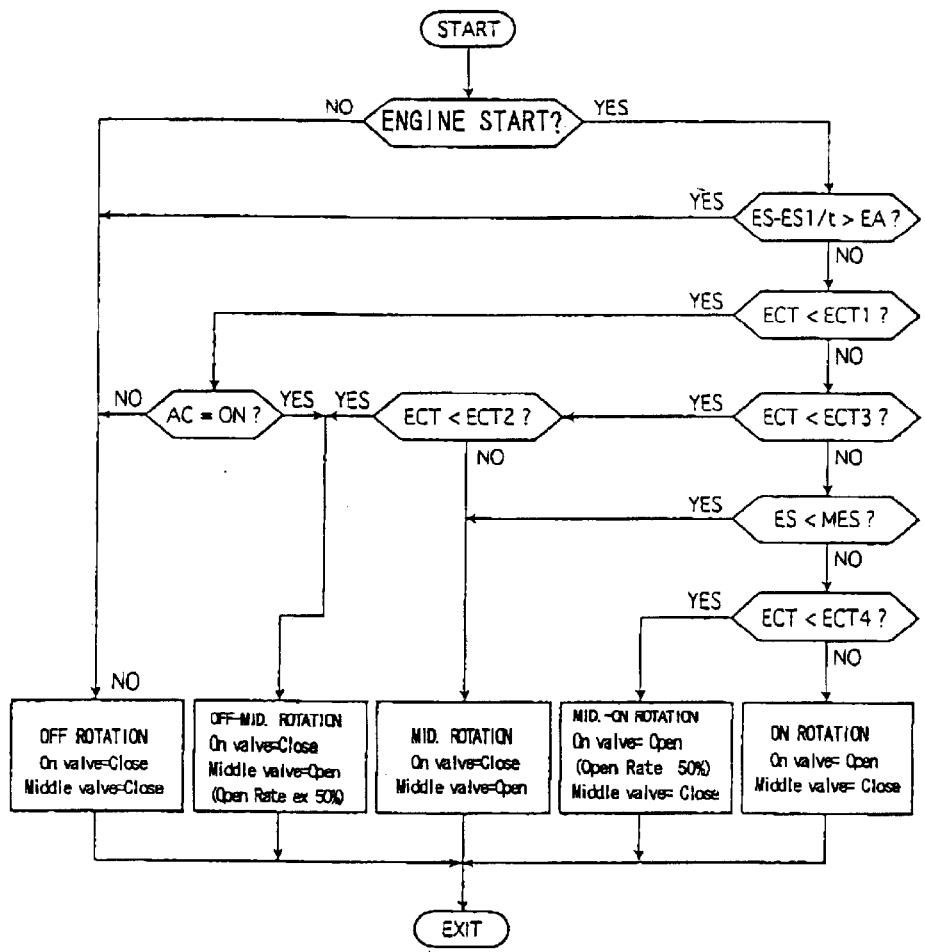
FIG. 8 is a flow chart showing other embodiment of the 5 switching control method of the same.
Figure 9:
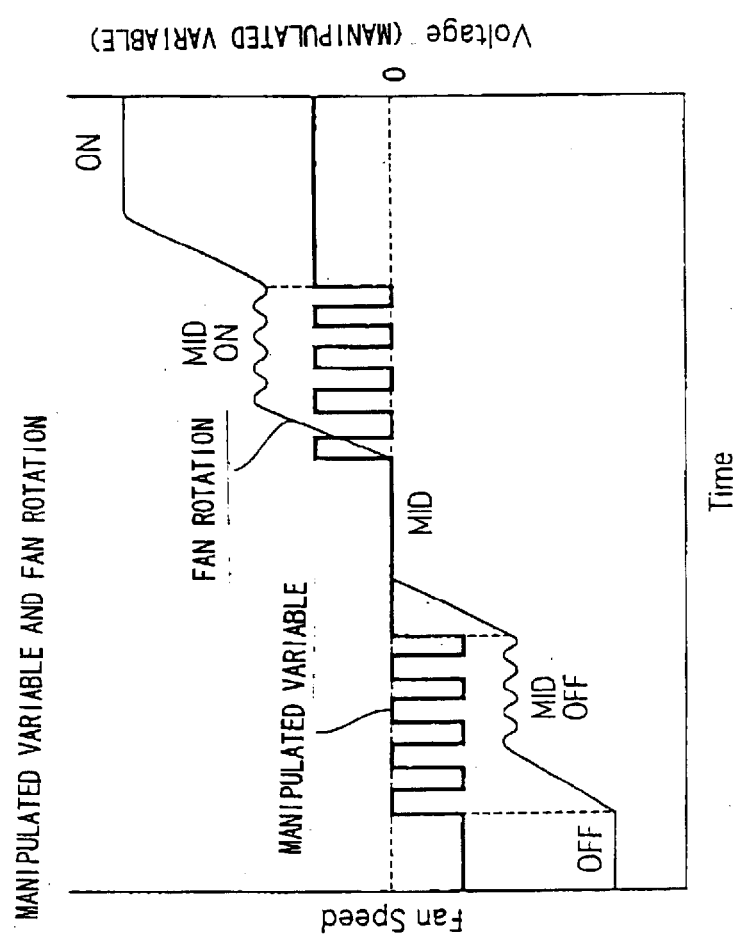
FIG. 9 is a view showing a relationship of manipulated variables and fan rotational speed in the 5 step switching control method shown in FIG. 7.
Figure 10:
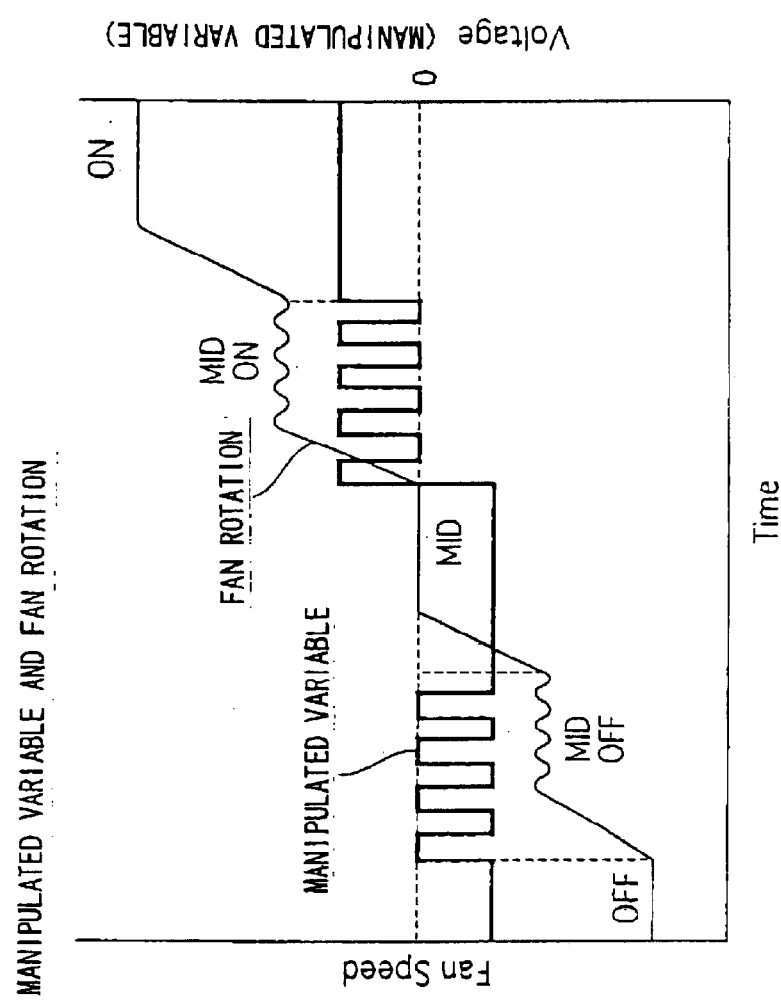
FIG. 10 is a view showing a relationship of manipulated variables and fan rotational speed in the 5 step switching control method shown in FIG. 8.

That is, during the period when the vehicle moves, the rotational speed ES of the vehicle engine is measured by the engine rotational speed measuring means, and based upon previously measured engine rotational speed vale ES1, acceleration of the engine (ES–ES1/t) is detected, and this engine acceleration (actual measurement value) is compared to an engine acceleration set value EA which was set in advance And, when the actual measurement value is larger than the set value EA, the On use valve and the Middle use valve are closed to make the fan Off rotation, and contrarily, when the actual measurement value is smaller than the set value EA, the engine coolant temperature ECT is measured by coolant temperature measuring means, and the coolant temperature ECT is compared to the engine coolant temperature lower limit threshold value ECT1 which was set in advance. As a result, when the engine coolant temperature ECT is smaller than the coolant temperature lower limit threshold value ECT1, whether the air conditioner AC operates or stops is detected, and when the air conditioner AC stops, the On use valve and the Middle use valve are closed to make the fan Off rotation, and when the air conditioner AC operates, the On use valve is closed and the Middle use valve is opened to make the fan Middle operation. On the other hand, when the coolant temperature ECT is larger than the lower limit threshold value ECT1, it is compared to the engine coolant temperature middle high threshold value ECT3, and when it is smaller than ECT3, the coolant temperature ECT is compared to the engine coolant temperature middle low threshold value ECT2. And, when the engine coolant temperature ECT is smaller than the engine coolant temperature middle low threshold value ECT2, the On use valve is closed and the Middle use valve is opened to make the fan Off rotation—Middle rotation, and contrarily, when ECT is larger than ECT2, the On use valve is opened and the Middle use valve is opened to make the fan Middle rotation. Also, when ECT is larger than ECT3, the engine rotational speed ES at that time is measured and in case that the rotational speed ES is smaller than the lower limit engine rotational speed MES for making the fan On rotation, the On use valve is closed, and the Middle use valve is opened to make the fan Middle rotation. Contrarily, in case that the engine rotational speed ES is larger than the lower limit engine rotational speed MES for making the fan On rotation, the engine coolant temperature ECT at that time is measured, and this measured value is compared to coolant temperature upper limit threshold value ECT4, and in case that the engine coolant temperature ECT is smaller than the engine coolant temperature upper limit threshold value ECT4, the On use valve is opened and the Middle use valve is closed, or the Middle use valve is opened to make the fan Middle rotation—On rotation, and contrarily, in case that the engine coolant temperature ECT is larger than the engine coolant temperature upper limit threshold value ECT4, the On use valve and the Middle use valve are opened, or only the On use valve is opened as shown in FIG. 8 to make the fan On rotation. In addition, also in this 5 step switching control, during the period when the engine stops, the On use valve and the Middle use valve are closed to make the fan Off rotation.

The step-less On/Off control method shown in FIGS. 11 to 14 is a control method for varying the fan rotation in step-less, by carrying out On/Off control of opening and closing of the oil supply valve, by using the engine coolant temperature, the state of using the air conditioner, acceleration state of the vehicle etc. as parameters.

Figure 12:
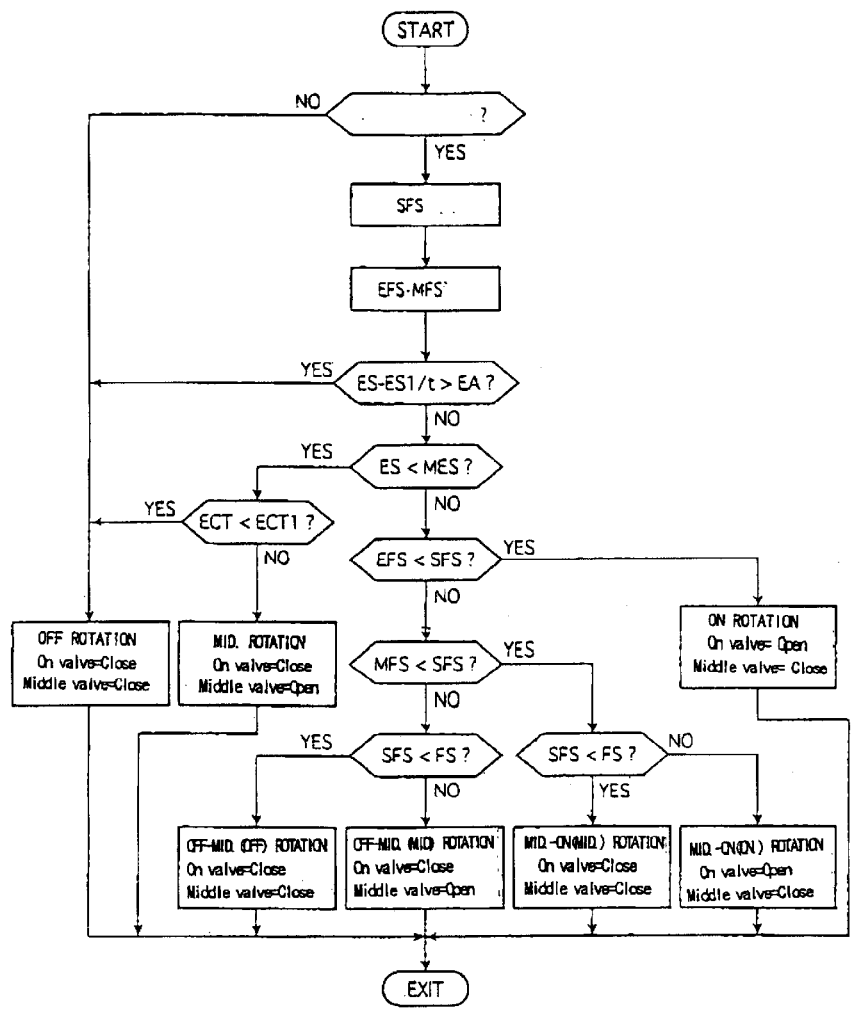
FIG. 12 is a flow chart showing other embodiment of the step-less On/Off control method of the same.
Figure 13:
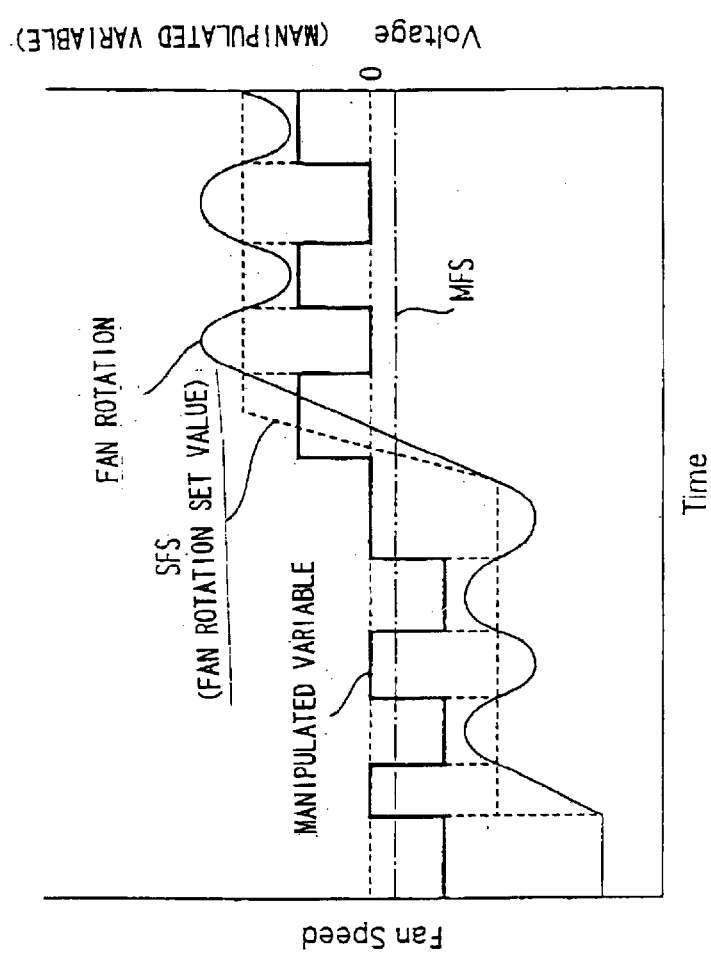
FIG. 13 is a view showing a relationship of manipulated variables and fan rotational speed of the step-less On/Off control method shown in FIG. 11.
Figure 14:
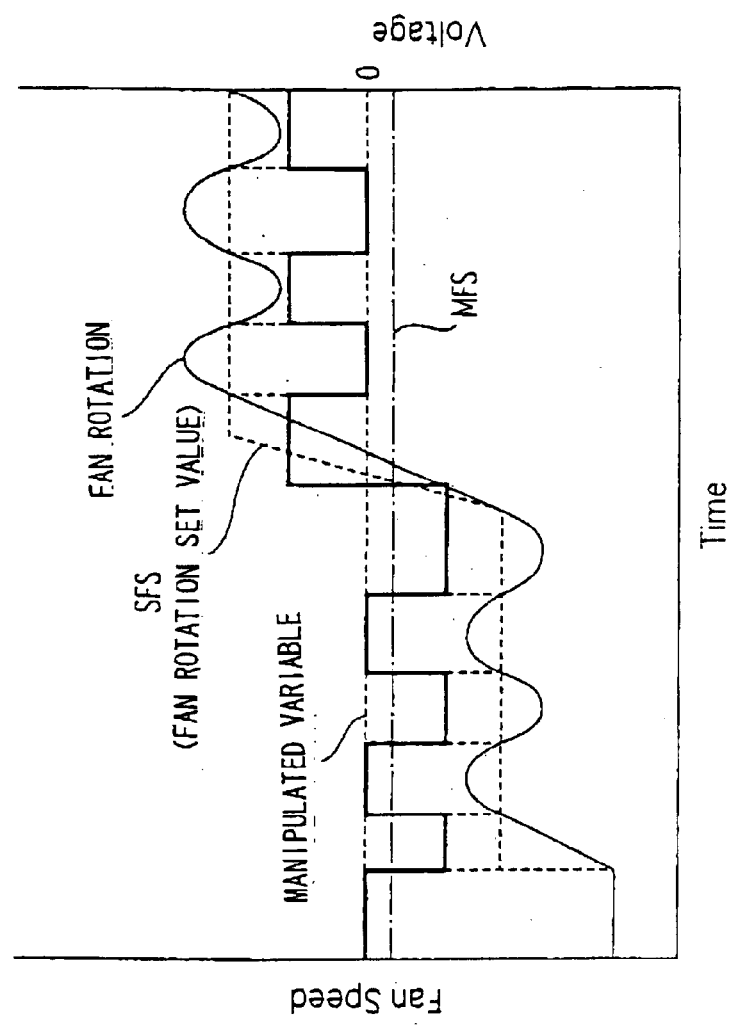
FIG. 14 is a view showing a relationship of manipulated variables and fan rotational speed of the step-less On/Off control method shown in FIG. 12.

That is, when a vehicle moves, a fan rotation set value SFS is determined on the basis of temperature of engine coolant, temperature of transmission oil, intake air temperature, compressor pressure of an air conditioner, and vehicle speed, and further, the engine rotational speed at that time is measured, and by using this measured value as a parameter, calculation is carried out and fan On rotational speed EFS and fan Middle rotational speed MFS are determined. After that, rotational speed ES of a vehicle engine is measured by engine rotational speed measuring means, and based upon previously measured engine rotational speed vale ES1, acceleration of the engine (ES–ES1/t) is detected, and this engine acceleration (actual measurement value) is compared to an engine acceleration set value EA which was set in advance. And, when the actual measurement value is larger than the set value EA, the On use valve and the Middle use valve are closed to make the fan Off rotation. On the other hand, when the actual measurement value is smaller than the set value EA, the engine rotational speed ES at the time is measured and it is compared to the lower limit engine rotational speed MES for making the fan On rotation. And, when the engine rotational speed ES is smaller than the lower limit engine rotational speed MES, the engine coolant temperature ECT at that time is measured, and when the engine coolant temperature ECT is smaller than the engine coolant temperature lower limit threshold value ECT1, the On use valve and the Middle use valve are closed to make the fan off rotation, and when ECT is larger than ECT1, the On use valve is closed and the Middle use valve is opened to make the fan Middle rotation. On the other hand, when the engine rotational speed ES is larger than the lower limit engine rotational speed MES for making the fan On rotation, the fan On rotational speed EFS is compared to the fan rotation set value SFS, and when EFS is smaller than SFS, the On use valve and the Middle use valve are opened, or only the On use valve is opened as shown in FIG. 12 to make the fan On rotation. On one hand, when EFS is larger than SFS, SFS is compared to the Middle rotational speed MFS, and when MFS is smaller than SFS, the fan rotational speed FS at that time is measured, and when the FS is larger than SFS, the On use valve is closed and the Middle use valve is opened to make the fan Middle rotation—On rotation, and when FS is smaller than SFS, the On use valve and the Middle use valve are opened to make the fan Middle rotation—On rotation. Also, when the fan Middle rotational speed MFS is larger than the fan rotational set value SFS, the fan rotational speed FS at that time is detected, and when FS is larger than SFS, the On use valve and the Middle use valve are closed to make the fan Off rotation—Middle rotation, and contrarily, when FS is smaller than SFS, the On use valve is closed and the Middle use valve is opened to make the fan Off rotation—Middle rotation.

In addition, also in this 5 step switching control, during the period when the engine stops, the On use valve and the Middle use valve are closed to make the fan Off rotation.

Figure 15:
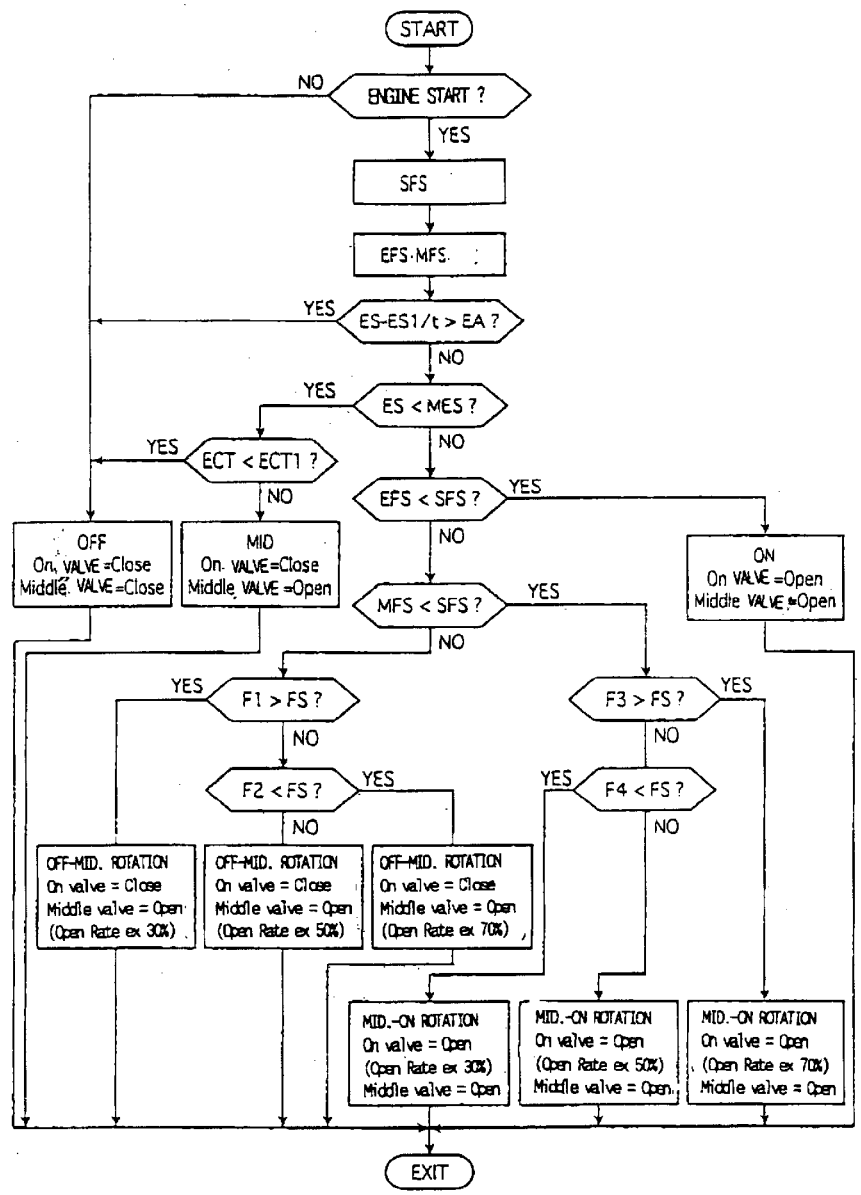
FIG. 15 is a flow chart showing one embodiment of a step-less switching control method of the same.
Figure 16:
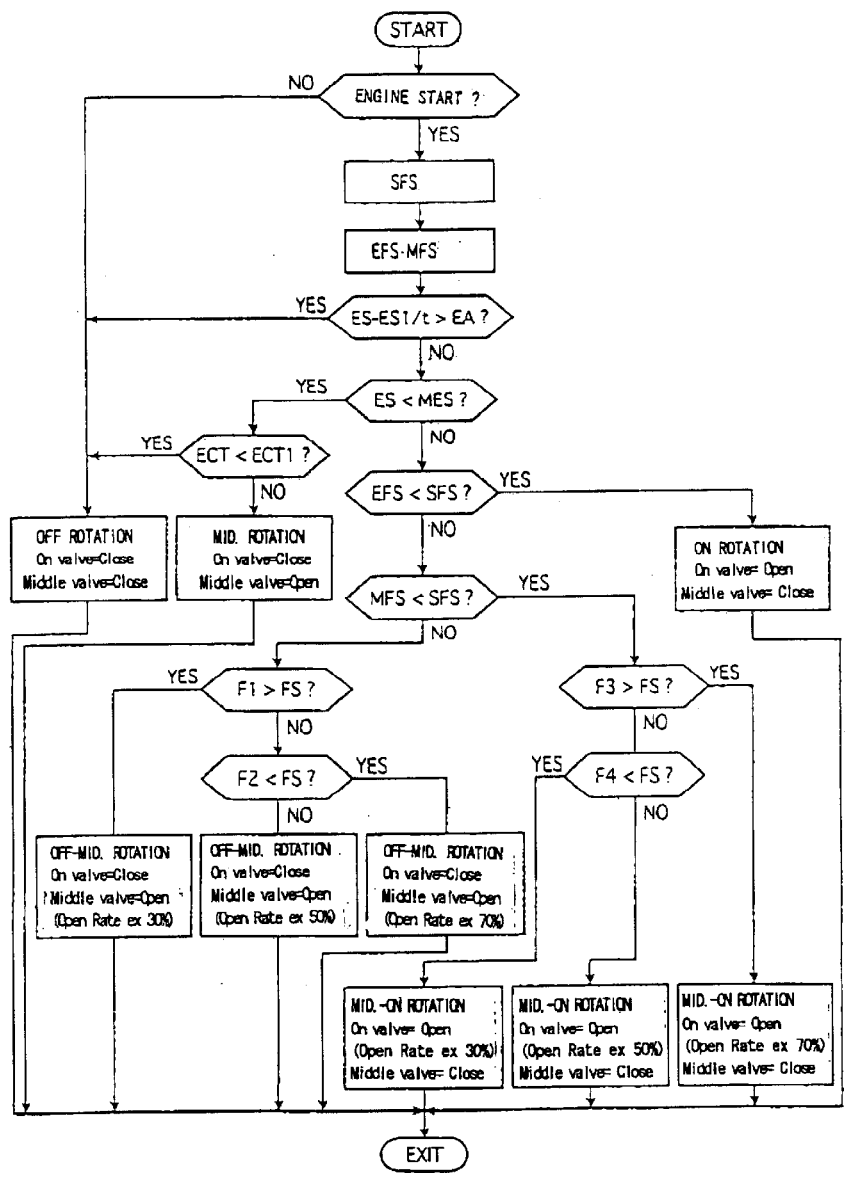
FIG. 16 is a flow chart showing other embodiment of a step-less switching control method of the same.
Figure 17:
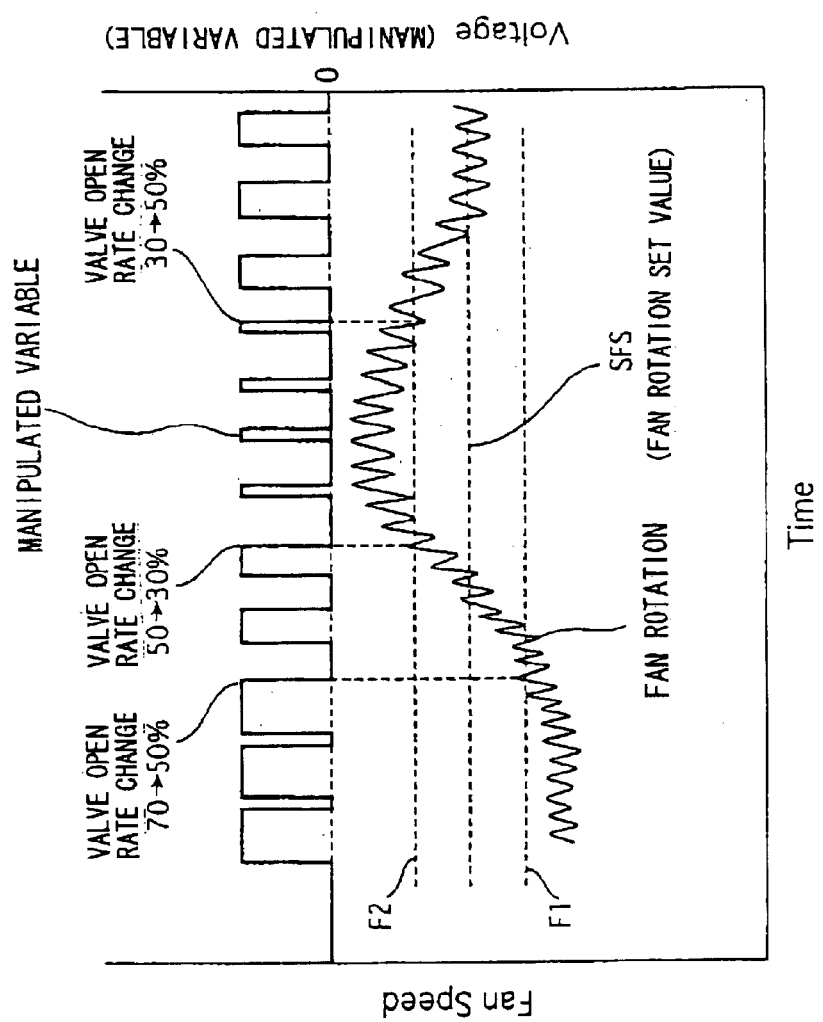
FIG. 17 is a view showing a relationship of manipulated variables and fan rotational speed in the step-less switching control methods shown in FIGS. 15 and 16.

A step-less switching control method shown in FIGS. 15 to 17 is a method for switching and controlling the fan rotation in step-less, by switching and controlling the On use valve and the Middle use valve at a certain determined duty rate (mainly, pulse width) by using the engine coolant temperature, the state of using the air conditioner, acceleration state of the vehicle etc. as parameter.

That is, when a vehicle moves, a fan rotation set value SFS is determined on the basis of temperature of engine coolant, temperature of transmission oil, intake air temperature, compressor pressure of an air conditioner, and vehicle speed, and further, the engine rotational speed at that time is measured, and by using this measured value as a parameter, calculation is carried out and fan On rotational speed EFS and fan Middle rotational speed MFS are determined. After that, rotational speed ES of a vehicle engine is measured by engine rotational speed measuring means, and based upon previously measured engine rotational speed vale ES1, acceleration of the engine (ES–ES1/t) is detected, and this engine acceleration (actual measurement value) is compared to an engine acceleration set value EA which was set in advance. And, when the actual measurement value is larger than the set value EA, the On use valve and the Middle use valve are closed to make the fan Off rotation. On the other hand, when the actual measurement value is smaller than the set value EA, the engine rotational speed ES at that time is measured, and it is compared to the lower limit engine rotational speed MES for making the fan On rotation. And, when the engine rotational speed ES is smaller than the lower limit engine rotational speed MES, the engine coolant temperature ECT at that time is measured, and when the engine coolant temperature ECT is smaller than the engine coolant temperature lower limit threshold value ECT1, the On use valve and the Middle use valve are closed to make the fan Off rotation, and when ECT is larger than ECT1, the On use valve is closed and the Middle use valve is opened to make the fan Middle rotation. On the other hand, when the engine rotational speed ES is larger than the lower limit engine rotational speed MESS for making the fan On rotation, the fan On rotational speed EFS is compared to the fan rotation set value SFS, and when EFS is smaller than SFS, the On use valve and the Middle use valve are opened to make the fan On rotation. On one hand, when EFS is larger than SFS, SFS is compared to the fan Middle rotational speed MFS, and when MFS is smaller than SFS, the fan rotational speed FS at that time is measured, and when the FS is smaller than the lower limit value F3 of the fan rotation set value, the On use valve is opened at a set opening rate, and the Middle valve is closed to make the fan Middle rotation—On rotation, and when FS is larger than F3, FS is compared to upper limit value F4 of the fan rotation set value, and when FS is larger than F4, the On use valve is opened at the set opening rate, and the Middle use valve is closed, or as shown in FIG. 16, the Middle use valve is opened to make the fan Middle rotation—On rotation, and contrarily, when FS is smaller than F4, the On use valve is opened at the set opening rate, and the Middle use valve is closed to make the fan Middle rotation—On rotation. On the other hand, when MFS is larger than SFS, the fan rotational speed FS at that time is compared to the lower limit value F1 of the fan rotation set value, and when FS is smaller than F1, the On use valve is closed and the Middle use valve is opened at the set opening rate to make the fan Off rotation—Middle rotation, and contrarily, when FS is larger than F1, FS is compared to the upper limit value F2 of the fan rotation set value, and when FS is larger than F2, the On use valve is closed, and the Middle use valve is opened at the set opening rate to make the fan Off rotation—Middle rotation, and contrarily, when FS is smaller than F2, the On use valve is closed and the Middle use valve is opened at the set opening rate to make the fan Off rotation—Middle rotation.

In addition, also in this step-less switching control, during the period when the engine stops, the On use valve and the Middle use valve are closed to make the fan Off rotation.

Also, in the step-less switching control method shown in FIG. 15, by always making the set opening rate of the On use valve and the Middle use valve 100% full open, a control characteristic of the fan can be controlled as the 3 step On/Off control shown in FIGS. 3 and 4, that is, controlled in 3 steps of Off rotation, Middle rotation, and On rotation. Further, by setting the set opening rates of the On use valve and the Middle use valve in the step-less control method shown in FIG. 15 to a constant opening rate (for example, 30%, 50%), respectively, the control characteristic of the fan can be controlled as the 5 step On/Off control shown in FIG. 7, that is, controlled in 5 steps of Off rotation, Off rotation—Middle rotation, Middle rotation, Middle rotation—On rotation, and On rotation.

Figure 11:
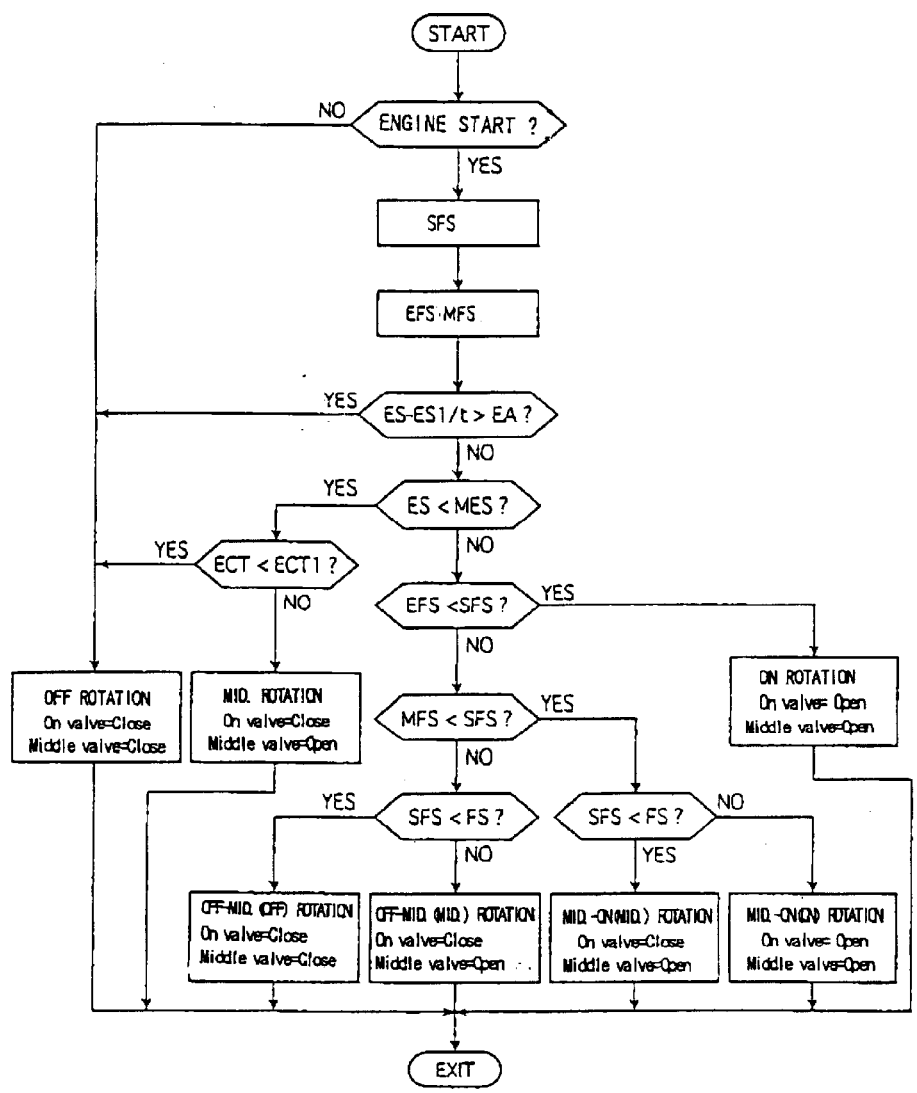
FIG. 11 is a flowchart showing one embodiment of a step-less On/Off control method of the same.
Figure 18:
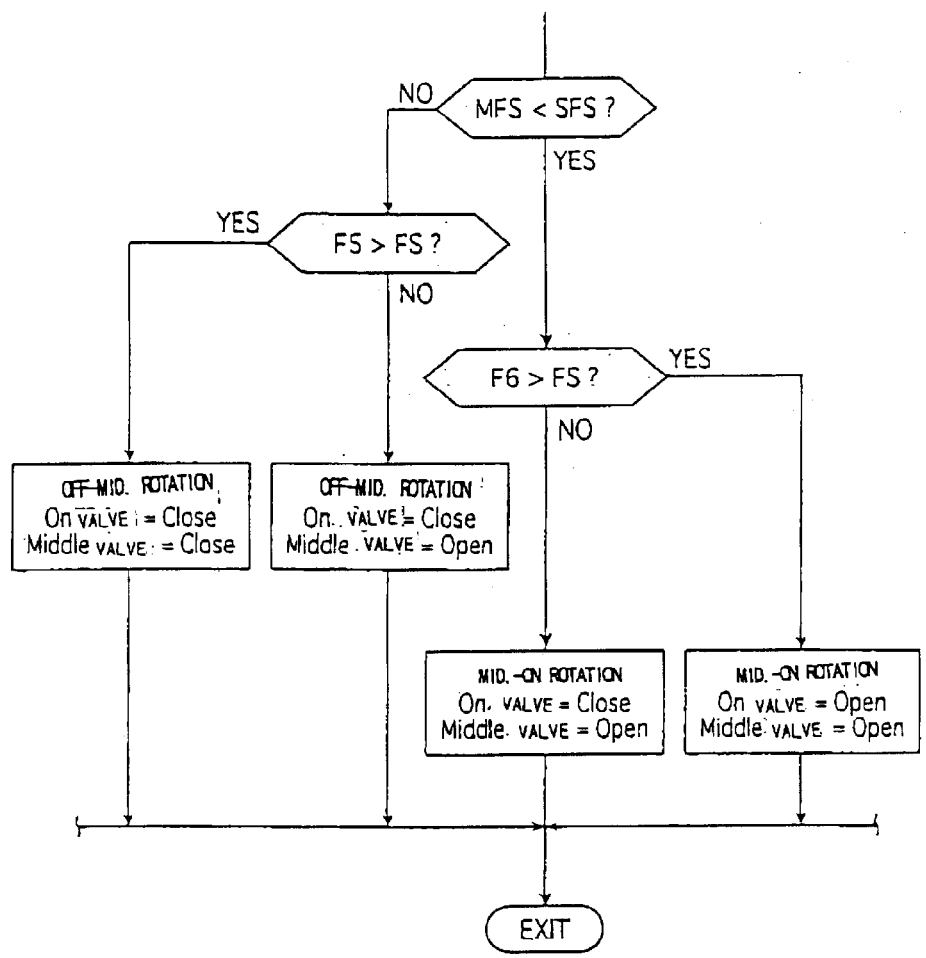
FIG. 18 is a flow chart showing only a relevant part of one embodiment in case that a step-less On/Off control method is carried out by the step-less switching control method shown in FIG. 15.
Figure 19:
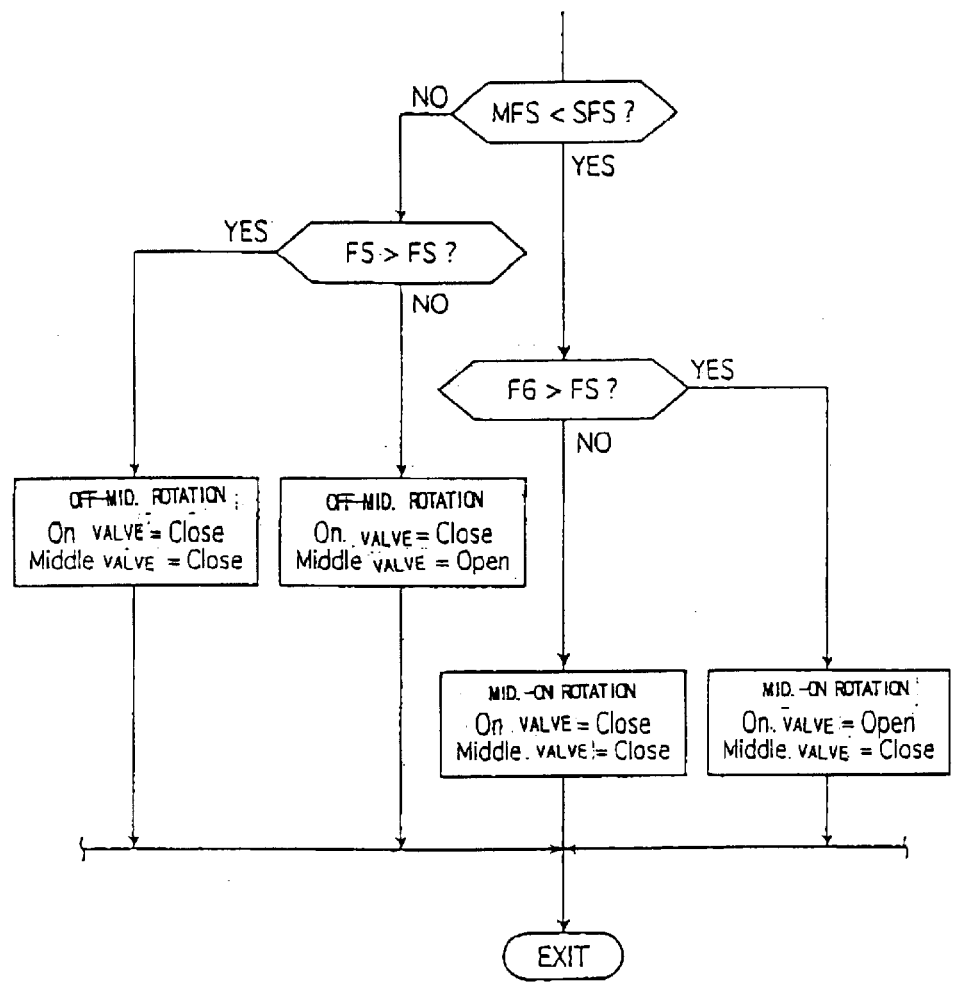
FIG. 19 is a flow chart showing only a relevant part of other embodiment in case that a step-less On/Off control method is carried out by the step-less switching control method shown in FIG. 15

Furthermore, in the step-less switching control method shown in FIG. 15, it is possible to carry out step-less On/Off control shown in FIG. 11. FIGS. 18 and 19 show a relevant part (common portion is omitted) of the flow chart, and when the fan On rotational speed EFS is larger than the fan rotation set value SFS, SFS is compared to the fan Middle rotational speed MFS, and when MFS is smaller than SFS, the fan rotational speed FS at that time is measured, and when the FS is smaller than upper limit value F6 of the fan rotation set value, the On use valve is 100% full-opened, and the Middle use valve is closed to make the fan Middle rotation—On rotation, and contrarily, when FS is larger than F6, the On use valve is full-opened in the same manner as the Middle use valve to make the fan Middle rotation—On rotation. On the other hand, when MFS is larger than SFS, the fan rotational speed FS at that time is compared to the lower limit value F5 of the fan rotation set value, and when FS is larger than F5, the On use valve is closed, and the Middle use value is full-opened to make the fan off rotation—Middle rotation.

As above, according to the 3 step On/off control method, the 5 step switching control method, the step-less On/Off control method, and the step-less switching control method shown in FIGS. 3 to 11, since the engine coolant temperature ECT, state of using the air conditioner AC, vehicle speed (acceleration) etc. are detected and the fan rotational speed is varied in 3 steps, 5 steps and step-less, water temperature can be held to a certain constant range (ECT1–ECT2), and also, regardless of the engine coolant temperature ECT, in case that the engine rotation is accelerated above a certain level, the fan coupling apparatus is forcibly turned Off and the tan noises due to coupling rotation can be prevented, and further, when the engine is less than constant rotational speed, the state of the fan coupling apparatus is made to be Off rotation and Middle rotation, and the fan noises due to fan coupling rotation at the time of acceleration can be prevented, and furthermore, when the engine starts up, the fan coupling apparatus is always turned to be in Off state, and the fan noises due to start-up coupling rotation can be prevented.

In addition, as to control factors, other than the above-described ones, transmission temperature, intake air temperature, AC compressor pressure, vehicle speed, accelerator opening rate etc. can be used for judging the fan rotation control.

As described above, according to the invention method, the following advantages will be obtained.
(1) By using temperature of radiator coolant as a control parameter, control is carried out so that fan rotation can be controlled so as to always fall in temperature range with good engine efficiency.
(2) By always detecting On/Off state of an air conditioner and compressor pressure, fan rotation can be maintained with good cooling efficiency of a condenser of an air conditioner, and the air conditioner cooling performance can be improved.
(3) By detecting engine rotational speed (accelerator opening rate), coupling rotation of a fan due to acceleration from the time of idling can be prevented and fan noises can be reduced.
(4) Since air flow quantity necessary for engine cooling can be obtained by arbitrarily controlling fan rotation, radiator efficiency can be more heightened than in a case that a conventional fan clutch was used, and accordingly, miniaturization and weight and cost saving of a radiator can be realized.
(5) Although high electric power (electric current value) is required when a valve is opened, electric power for holding a state that the valve is fully opened is not required so much since distance between of a coil (electromagnet) and the valve is reduced and it is possible to attract with wear magnetic force. Therefore, power supply is carried out by use of pulse waves and On-Off ratio of the pulse wave is changed and thereby, power consumption can be suppressed and heat generation of the coil can be suppressed.

What is claimed is:

1. A control method for an outside control type fan coupling apparatus of such a double valve structure that an inside of a sealed housing comprising a case which is supported through a bearing on a rotation shaft to whose tip a drive disc is fixed and a cover which is attached to the case is divided into an oil holding chamber and a torque transmission chamber in which the drive disc is mounted by a partition plate which has an oil supply adjustment hole, and a dam and a circulation flow path which is strung to this and comes over from the torque transmission chamber side to the oil holding chamber are formed in a part of an inside wall of the sealed housing side which holds the oil at the time of rotation and opposes to an outside wall of the drive disc, and a valve member for opening and closing the oil supply adjustment hole is disposed in the oil holding chamber, and made is such a system that a running torque transmission from a driving side to a driven side is controlled by increasing and decreasing an effective contact area of oil at a torque transmission gap part which is formed by the driving side and the driven side, and made is such a structure that, at the oil holding chamber side of the sealed housing, a non-excitation type electromagnet utilizing a permanent magnet is supported to the rotation shaft through the bearing, and the valve member is operated by the electromagnet and thereby, oil supply adjustment hole is controlled to be opened or closed, and a plurality of the oil supply adjustment holes are disposed, and an On use valve and a Middle use valve in which the valve member and the non-excitation type electromagnet are disposed with respect to each oil supply adjustment hole are disposed, wherein an acceleration of an engine is detected when a vehicle moves, and when the acceleration is larger than a set value, the On use valve and the Middle use valve are closed to make a fan Off rotation, and when the acceleration is smaller than the set value, engine coolant temperature is detected, and when the coolant temperature is smaller than a lower limit threshold value, an operational state of an air conditioner is detected, and when the air conditioner does not operate, the On use valve and the Middle use valve are closed to make the fan Off rotation, and when the air conditioner operates, the On use valve is closed and the Middle use valve is opened to make the fan Middle rotation, and on the other hand, when the coolant temperature is larger than the lower limit threshold value and smaller than an upper limit threshold value, the On use valve is closed and the Middle use valve is opened to make the fan Middle rotation, and when the coolant temperature is larger than the upper limit threshold value, rotational speed of the engine at that time is detected, and in case that the rotational speed is smaller than a lower limit engine rotational speed for making the fan On rotation, the On use valve is closed and the Middle use valve is opened to make the fan Middle rotation, and in case that it is larger than the lower limit engine rotational speed, the On use valve and the Middle use valve are opened, or only the On use valve is opened to make the fan On rotation, and when the engine stops, the On use valve and the Middle use valve are closed to make the fan Off rotation.

2. A control method for an outside control type fan coupling apparatus of such a double valve structure that an inside of a sealed housing comprising a case which is supported through a bearing on a rotation shaft to whose tip a drive disc is fixed and a cover which is attached to the case is divided into an oil holding chamber and a torque transmission chamber in which the drive disc is mounted by a partition plate which has an oil supply adjustment hole, and a dam and a circulation flow path which is strung to this and comes over from the torque transmission chamber side to the oil holding chamber are formed in a part of an inside wall of the sealed housing side which holds the oil at the time of rotation and opposes to an outside wall of the drive disc, and a valve member for opening and closing the oil supply adjustment hole is disposed in the oil holding chamber, and made is such a system that a running torque transmission from a driving side to a driven side is controlled by increasing and decreasing an effective contact area of oil at a torque transmission gap part which is formed by the driving side and the driven side, and made is such a structure that, at the oil holding chamber side of the sealed housing, a non-excitation type electromagnet utilizing a permanent magnet is supported to the rotation shaft through the bearing, and the valve member is operated by the electromagnet and thereby, oil supply adjustment hole is controlled to be opened or closed, and a plurality of the oil supply adjustment holes are disposed, and an On use valve and a Middle use valve in which the valve member and the non-excitation type electromagnet are disposed with respect to each oil supply adjustment hole are disposed, wherein an acceleration of an engine is detected when a vehicle moves, and when the acceleration is larger than a set value, the On use valve and the Middle use valve are closed to make a fan Off rotation, and when the acceleration is smaller than the set value, engine coolant temperature is detected, and when the coolant temperature is smaller than a lower limit threshold value, an operational state of an air conditioner is detected, and when the air conditioner does not operate, the On use valve and the Middle use valve are closed to make the fan Off rotation, and when the air conditioner operates, the On use valve is closed and the Middle use valve is opened and closed to make the fan Off rotation—Middle rotation, and on the other hand, when the coolant temperature is larger than the lower limit threshold value and smaller than a middle high threshold value, the coolant temperature is compared to a middle low threshold value, and when the coolant temperature is lower than the middle low threshold value, the On use valve is closed and the Middle use valve is opened to make the fan Middle rotation, and when the coolant temperature is larger than a middle high threshold value, rotational speed of the engine at that time is detected, and in case that the rotational speed is smaller than a lower limit engine rotational speed for making the fan On rotation, the On use valve is closed and the Middle use valve is opened to make the fan Middle rotation, and in case that it is larger than the lower limit engine rotational speed, the coolant temperature at that time is detected, and the coolant temperature is compared to the upper limit threshold value, and when the coolant temperature is smaller than the upper limit threshold value, the Middle use value is closed, or the Middle use valve is opened, and the On use valve is opened and closed, to make the fan Middle rotation—On rotation, and when it is larger than the upper limit threshold value, the On use valve and the Middle use valve are opened to make the fan On rotation, and when the engine stops, the On use valve and the Middle use valve are closed to make the fan Off rotation.

3. A control method for an outside control type fan coupling apparatus of such a double valve structure that an inside of a sealed housing comprising a case which is supported through a bearing on a rotation shaft to whose tip a drive disc is fixed and a cover which is attached to the case is divided into an oil holding chamber and a torque transmission chamber in which the drive disc is mounted by a partition plate which has an oil supply adjustment hole, and a dam and a circulation flow path which is strung to this and comes over from the torque transmission chamber side to the oil holding chamber are formed in a part of an inside wall of the sealed housing side which holds the oil at the time of rotation and opposes to an outside wall of the drive disc, and a valve member for opening and closing the oil supply adjustment hole is disposed in the oil holding chamber, and made is such a system that a running torque transmission from a driving side to a driven side is controlled by increasing and decreasing an effective contact area of oil at a torque transmission gap part which is formed by the driving side and the driven side, and made is such a structure that, at the oil holding chamber side of the sealed housing, a non-excitation type electromagnet utilizing a permanent magnet is supported to the rotation shaft through the bearing, and the valve member is operated by the electromagnet and thereby, oil supply adjustment hole is controlled to be opened or closed, and a plurality of the oil supply adjustment holes are disposed, and an On use valve and a Middle use valve in which the valve member and the non-excitation type electromagnet are disposed with respect to each oil supply adjustment hole are disposed, wherein when a vehicle moves, a fan rotation set value is determined on the basis of temperature of engine coolant, temperature of transmission oil, intake air temperature, compressor pressure of an air conditioner, and vehicle speed, and further, on the basis of the engine rotational speed, fan On rotational speed and fan Middle rotational speed are determined, and when acceleration of the engine is larger than the set value, the On use valve and the Middle use valve are closed to make the fan Off rotation, and when the acceleration is smaller than the set value, the engine rotational speed is detected, arid when the rotational speed is smaller than a lower limit engine rotational speed for making the fan On rotation, the temperature of engine coolant is detected, and when the temperature of the coolant is lower than the lower limit threshold valve, the On use valve and the Middle use valve are closed to make the fan Off rotation, and when the temperature of engine coolant is larger than the lower limit threshold value, the On use valve is closed and the Middle use valve is opened to have Middle rotation, and when the engine rotational speed is larger than the lower limit engine rotational speed for making the fan On rotation, the fan On rotational speed is compared to the fan rotation set value, and when the fan On rotational speed is smaller than the fan rotation set value, the On use valve and the Middle use valve are opened, or only the On use valve is opened to make the fan On rotation, and when the fan On rotational speed is larger than the fan rotation set value, the lower limit engine rotational speed for making the fan On rotation is compared to the fan rotation set value, and when the lower limit engine rotational speed for making the fan On rotation is smaller than the fan rotation set value, the fan rotational speed is detected, and when the rotational speed is larger than the fan rotation set value, the On use valve is closed and the Middle use valve is opened to make the fan Middle rotation—On rotation, and when the fan rotational speed is smaller than the fan rotation set value, the On use valve and the Middle use valve are opened to make the fan Middle rotation—On rotation, and when the Middle rotational speed is larger than the fan rotation set value, the fan rotational speed is detected, and when the rotational speed is larger than the fan rotation set value, the On use valve and the Middle use valve are closed to make the fan Off rotation—Middle rotation, and when the fan rotational speed is smaller than the fan rotation set value, the On use valve is closed and the Middle use valve is opened to make the fan Off rotation—Middle rotation, and when the engine stops, the On use valve and the Middle use valve are closed to make the fan Off rotation.

4. A control method for an outside control type fan coupling apparatus of such a double valve structure that an inside of a sealed housing comprising a case which is supported through a bearing on a rotation shaft to whose tip a drive disc is fixed and a cover which is attached to the case is divided into an oil holding chamber and a torque transmission chamber in which the drive disc is mounted by a partition plate which has an oil supply adjustment hole, and a dam and a circulation flow path which is strung to this and comes over from the torque transmission chamber side to the oil holding chamber are formed in a part of an inside wall of the sealed housing side which holds the oil at the time of rotation and opposes to an outside wall of the drive disc, and a valve member for opening and closing the oil supply adjustment hole is disposed in the oil holding chamber, and made is such a system that a running torque transmission from a driving side to a driven side is controlled by increasing and decreasing an effective contact area of oil at a torque transmission gap part which is formed by the driving side and the driven side, and made is such a structure that, at the oil holding chamber side of the sealed housing, a non-excitation type electromagnet utilizing a permanent magnet is supported to the rotation shaft through the bearing, and the valve member is operated by the electromagnet and thereby, oil supply adjustment hole is controlled to be opened or closed, and a plurality of the oil supply adjustment holes are disposed, and an On use valve and a Middle use valve in which the valve member and the non-excitation type electromagnet are disposed with respect to each oil supply adjustment hole are disposed, wherein when a vehicle moves, a fan rotation set value is determined on the basis of temperature of engine coolant, temperature of transmission oil, intake air temperature, compressor pressure of an air conditioner, and vehicle speed, and further, on the basis of the engine rotational speed, fan On rotational speed and fan Middle rotational speed are determined, and when acceleration of the engine is larger than the set value, the On use valve and the Middle use valve are closed to make the fan Off rotation, and when the acceleration is smaller than the set value, the engine rotational speed is detected, and when the rotational speed is smaller than a lower limit engine rotational speed for making the fan On rotation, the temperature of engine coolant is detected, and when the temperature of the coolant is smaller than the lower limit threshold valve, the On use valve and the Middle use valve are closed to make the fan Off rotation, and when the temperature of engine coolant is larger than the lower limit threshold value, the On use valve is closed and the Middle use valve is opened to have Middle rotation and when the engine rotational speed is larger than the lower limit engine rotational speed for making the fan On rotation, the fan On rotational speed is compared to the fan rotation set value, and when the fan On rotational speed is smaller than the fan rotation set value, the On use valve and the Middle use valve are opened, or only the On use valve is opened to make the fan On rotation, and when the fan On rotational speed is larger than the fan rotation set value, the fan Middle rotational speed is compared to the fan rotation set value, and when the fan Middle rotational speed is smaller than the fan rotation set value, the fan rotational speed is detected, and when the rotational speed is smaller than the a lower limit of the fan rotation set value, the On use valve is opened at a set opening rate, and the Middle use valve is closed, or the Middle use valve is opened to make the fan Middle rotation—On rotation, and when the fan rotational speed is larger than the lower limit of the fan rotation set value, the fan rotational speed is compared to the upper limit of the fan rotation set value, and when the fan rotational speed is larger than the upper limit of the fan rotation set value, the On use valve is opened at the set opening rate, and the Middle use valve is closed, or the Middle use valve is opened to make the fan Middle rotation—On rotation, and when the fan rotational speed is smaller than the upper limit of the fan rotation set value, the On use valve is opened at the set opening rate, and the Middle use valve is closed, or the Middle use valve is opened to make the fan Middle rotation—On rotation, and when the fan Middle rotational speed is larger than the fan rotation set value, the fan rotational speed is detected, and when the rotational speed is smaller than the lower limit of the fan rotation set value, the On use valve is closed, and the Middle use valve is opened at the set opening rate to make the fan Off rotation—Middle rotation, and when the fan rotational speed is larger than the lower limit of the fan rotation set value, the fan rotational speed is compared to the upper limit of the fan rotation set value, and when the fan rotational speed is larger than the upper limit of the fan rotation set value, the On use valve is closed, and the Middle use valve is opened at the set opening rate to make the fan Off rotation—Middle rotation, and when the fan rotational speed is smaller than the upper limit of the fan rotation set value, the On use valve is closed and the Middle use valve is opened at the set opening rate to make the fan Off rotation—Middle rotation, and when the engine stops, the On use valve and the Middle use valve are closed to make the fan Off rotation.

5. A control method for an outside control type fan coupling apparatus as set forth in claim 4, wherein the set opening rates of the On use valve and the Middle use valve are always set to 100% full-open, respectively so that a control characteristic of the fan is controlled by 3 steps of Off rotation, Middle rotation, and On rotation.

6. A control method for an outside control type fan coupling apparatus as set forth in claim 4, wherein the set opening rates of the On use valve and the Middle use valve are set to a constant opening rate so that a control characteristic of the fan is controlled by 5 steps of Off rotation, Off rotation—Middle rotation, Middle rotation, Middle rotation—On rotation, and On rotation.

7. A control method for an outside control type fan coupling apparatus of such a double valve structure that an inside of a sealed housing comprising a case which is supported through a bearing on a rotation shaft to whose tip a drive disc is fixed and a cover which is attached to the case is divided into an oil holding chamber and a torque transmission chamber in which the drive disc is mounted by a partition plate which has an oil supply adjustment hole, and a dam and a circulation flow path which is strung to this and comes over from the torque transmission chamber side to the oil holding chamber are formed in a part of an inside wall of the sealed housing side which holds the oil at the time of rotation and opposes to an outside wall of the drive disc, and a valve member for opening and closing the oil supply adjustment hole is disposed in the oil holding chamber, and made is such a system that a running torque transmission from a driving side to a driven side is controlled by increasing and decreasing an effective contact area of oil at a torque transmission gap part which is formed by the driving side and the driven side, and made is such a structure that, at the oil holding chamber side of the sealed housing, a non-excitation type electromagnet utilizing a permanent magnet is supported to the rotation shaft through the bearing, and the valve member is operated by the electromagnet and thereby, oil supply adjustment hole is controlled to be opened or closed, and a plurality of the oil supply adjustment holes are disposed, and an On use valve and a Middle use valve in which the valve member and the non-excitation type electromagnet are disposed with respect to each oil supply adjustment hole are disposed, wherein when a vehicle moves, a fan rotation set value is determined on the basis of temperature of engine coolant, temperature of transmission oil, intake air temperature, compressor pressure of an air conditioner, and vehicle speed, and further, on the basis of the engine rotational speed, fan On rotational speed and fan Middle rotational speed are determined, and when acceleration of the engine is larger than the set value, the On use valve and the Middle use valve are closed to make the fan Off rotation, and when the acceleration is smaller than the set value, the engine rotational speed is detected, and when the rotational speed is smaller than a lower limit engine rotational speed for making the fan On rotation, the temperature of engine coolant is detected, and when the temperature of the coolant is lower than the lower limit threshold valve, the On use valve and the Middle use valve are closed to make the fan Off rotation, and when the temperature of engine coolant is larger than the lower limit threshold value, the On use valve is closed and the Middle use valve is opened to have fan Middle rotation, and when the engine rotational speed is larger than the lower limit engine rotational speed for making the fan On rotation the fan On rotational speed is compared to the fan rotation set value, and when the fan On rotational speed is smaller than the fan rotation set-value, the On use valve and the Middle use valve are opened, or only the On use valve is opened to make the fan On rotation, and when the fan On rotational speed is larger than the fan rotation set value, the fan Middle rotational speed is compared to the fan rotation set value, and when the fan Middle rotational speed is smaller than the fan rotation set value, the fan rotational speed is detected, and when the rotational speed is smaller than a certain set value, the On use valve is fully opened and the Middle use valve is closed, or the Middle use valve is opened to make the fan Middle rotation—On rotation, and when the fan rotational speed is larger than the certain set value, the On use valve is fully opened and the Middle use valve is closed, or the Middle use valve is opened to make the fan Middle rotation—On rotation, and when the fan Middle rotational speed is larger than the fan rotation set value, the fan rotational speed is detected, and when the rotational speed is smaller than the certain set value, the On use valve is closed and the Middle use valve is fully opened to make the fan Off rotation—Middle rotation, and when the fan rotational speed is larger than the certain set value, the On use valve and the Middle use valve are closed to make the fan Off rotation—Middle rotation, and when the engine stops, the On use valve and the Middle use valve are closed to make the fan Off rotation.

* * * * *